(12) United States Patent
Kuznetsov et al.

(10) Patent No.: US 11,468,912 B2
(45) Date of Patent: Oct. 11, 2022

(54) DEVICE AND ARRANGEMENT FOR CONTROLLING AN ELECTROMAGNETIC WAVE, METHODS OF FORMING AND OPERATING THE SAME

(71) Applicant: Agency for Science, Technology and Research, Singapore (SG)

(72) Inventors: Arseniy Kuznetsov, Singapore (SG); Ramon Jose Paniagua Dominguez, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1095 days.

(21) Appl. No.: 16/076,258

(22) PCT Filed: Jan. 26, 2017

(86) PCT No.: PCT/SG2017/050039
§ 371 (c)(1),
(2) Date: Aug. 7, 2018

(87) PCT Pub. No.: WO2017/138886
PCT Pub. Date: Aug. 17, 2017

(65) Prior Publication Data
US 2021/0272596 A1  Sep. 2, 2021

(30) Foreign Application Priority Data
Feb. 11, 2016 (SG) .......................... 10201600998W

(51) Int. Cl.
*G11B 7/2433* (2013.01)
*H01Q 15/00* (2006.01)
(Continued)

(52) U.S. Cl.
CPC .......... *G11B 7/2433* (2013.01); *G02F 1/0126* (2013.01); *G02F 1/0147* (2013.01);
(Continued)

(58) Field of Classification Search
CPC ... G11B 7/2433; G02F 1/0126; G02F 1/0147; G02F 1/29; G02F 2203/12;
(Continued)

(56) References Cited

U.S. PATENT DOCUMENTS 5,608,569 A    3/1997  Kim
6,197,399 B1   3/2001  Naito et al.
(Continued)

FOREIGN PATENT DOCUMENTS

CN    101943803 A    1/2011
WO   2014171992 A2  10/2014

OTHER PUBLICATIONS

Gholipouret. al., "An All-Optical, Non-Volitile, Bidirectional, Phase-Change Meta Switch", 2013. Advanced Materials, Material Views , pp. 3050-2054. (Year: 2013).*
(Continued)

*Primary Examiner* — Andrew Sasinowski
(74) *Attorney, Agent, or Firm* — Shackelford, Brown, McKinley & Norton, LLP

(57) ABSTRACT

Various embodiments may provide a device for controlling an electromagnetic wave according to various embodiments. The device may include a medium. The device may further include an array of elements in contact with the medium and may be configured to receive the electromagnetic wave. Each element of the array of elements may include a phase change material configured to switch from, at least, a first state to a second state in response to an external input, thereby changing an optical property of the respective element to control the electromagnetic wave.

20 Claims, 37 Drawing Sheets

100a

100b

(51) Int. Cl.
*H01Q 3/46* (2006.01)
*G02F 1/29* (2006.01)
*G02F 1/01* (2006.01)

(52) U.S. Cl.
CPC .............. *G02F 1/29* (2013.01); *H01Q 3/46* (2013.01); *H01Q 15/0066* (2013.01); *G02F 2203/12* (2013.01); *G02F 2203/30* (2013.01); *G02F 2203/50* (2013.01)

(58) Field of Classification Search
CPC ............. G02F 2203/30; G02F 2203/50; G02F 2202/30; H01Q 3/46; H01Q 15/0066; H01Q 15/006
See application file for complete search history.

(56) References Cited

U.S. PATENT DOCUMENTS

| | | | |
|---|---|---|---|
| 8,848,273 B2 | 9/2014 | Yu et al. | |
| 2010/0073232 A1* | 3/2010 | Sajuyigbe | H01Q 15/006 342/372 |
| 2014/0133285 A1 | 5/2014 | Fujinoki et al. | |
| 2016/0156090 A1* | 6/2016 | Campione | H01Q 15/006 333/219.1 |
| 2016/0181322 A1 | 6/2016 | Mazed et al. | |
| 2017/0235126 A1* | 8/2017 | DiDomenico | H01L 31/0547 349/1 |
| 2018/0123253 A1* | 5/2018 | Weinmann | H01P 3/122 |

OTHER PUBLICATIONS

Gholipour et al., "An All-Optical, Non-Volatile, Bidirectional, Phase-Change Meta-Switch," Advanced Materials, vol. 25, No. 22, Apr. 29, 2013, pp. 3050-3054.
Zou et al., "Phase Change Material Based Tunable Reflectarray for Free Space Optical Inter/Intra Chip Interconnects," Optics Express, vol. 22, No. 20, Sep. 25, 2014, pp. 24142-24148.
Yamada et al., "Phase-Change Nanodot Material for an Optical Memory," Advanced Optical Materials, vol. 1, No. 11, Aug. 2, 2013, pp. 820-826.
Kocer et al., "Thermal Tuning of Infrared Resonant Absorbers Based on Hybrid Gold-VO2 Nanostructures," Applied Physics Letter, vol. 106, Apr. 22, 2015, pp. 161104: 1-4.
Tsuda et al., "Compact Optical Switch Using Phase-Change Material for Transparent Photonic Network," Nov. 28, 2013, pp. 1-4.
Chu et al., "Active Dielectric Metasurface Based on Phase-Change Medium," Laser & Photonics Review, vol. 10, No. 6, Oct. 12, 2016, pp. 986-994.
Yu, et al., "Light Propagation with Phase Discontinuities: Generalized Laws of Reflection and Refraction," Science, vol. 334, Oct. 21, 2011, pp. 333-337.
Zhu et al., "A Flat Lens with Tunable Phase Gradient by Using Random Access Reconfigurable Metamaterial," Advanced Materials, vol. 27, 2015, pp. 4739-4743.
Iyer, et al., "Reconfigurable Semiconductor Phased-Array Metasurfaces," ACS Photonics, vol. 2, 2015, pp. 1077-1084.
Shcherbakov et al., "Ultrafast All-Optical Switching with Magnetic Resonances in Nonlinear Dielectric Nanostructures," Nano Letters, vol. 15, 2015, pp. 6985-6990.
Chen et al.. "Hybrid Phase-Change Plasmonic Crystals for Active Tuning of Lattice Resonances," Optics Express, vol. 21, No. 11, Jun. 3, 2013, pp. 13691-13698.
Sautter, et al., "Active Tuning of All-Dielectric Metasurfaces," ACS Nano, vol. 9, No. 4, 2015, pp. 4308-4315.
Wang et al., "Optically Reconfigurable Photonic Devices," arXiv:1508.03818, 2015, pp. 1-12.
Evlyukhin, et al., Optical Response Features of Si-Nanoparticle Arrays, Phys. Rev. B, vol. 82, 2010, pp. 045404-1-12.
Garcia-Etxarri, et al., "Strong Magnetic Response of Submicron Silicon Particles in the Infrared," Optics Express, vol. 19, No. 6, Mar. 14, 2011, pp. 4815-4826.
Kuznetsov et al., "Magnetic Light," Scientific Reports, vol. 2, No. 492, Jul. 4, 2012, pp. 1-6.
Fu et al., "Directional Visible Light Scattering by Silicon Nanoparticles," Nature Communications, vol. 4, No. 1527, Feb. 26, 2013, pp. 1-6.
Yu et al., "High-Transmission Dielectric Metasurface with $2\pi$ Phase Control at Visible Wavelengths," Laser & Photonics Reviews, vol. 9, No. 4, 2015, pp. 412-418.
Luk'Yanchuk et al., "Optimum Forward Light Scattering by Spherical and Spheroidal Dielectric Nanoparticles with High Refractive Index," ACS Photonics, vol. 2, 2015, pp. 993-999.
Staude et al., "Tailoring Directional Scattering Through Magnetic and Electric Resonances in Subwavelength Silicon Nanodisks," ACS Nano, vol. 7, No. 9, 2013, pp. 7824-7832.
Decker et al., "High-Efficiency Dielectric Huygens' Surfaces," Advanced Optical Materials, vol. 3, 2015, pp. 813-820.
Simpson, R.E., "Chalcogenide Thin Film Materials for Next Generation Data Storage," PhD Thesis, University of Southampton, downloadable at http://eprints.soton.ac.uk, Jan. 2008, pp. 1-221.
Office Action for Chinese Patent Application No. 201780011146.8 dated Nov. 9, 2021, pp. 1-8.
International Preliminary Report on Patentability for International Application No. PCT/SG2017/050039 dated Feb. 28, 2018, pp. 1-23.

* cited by examiner

Provide a substrate

402

Form an array of elements in contact with the substrate and configured to receive the electromagnetic wave.

Provide or direct the electromagnetic wave to the device

502

Apply the external input to switch the phase change material from at least, a first state to a second state, thereby changing an optical property of the respective element to control the electromagnetic wave received by the array of elements

504

760

770

1100a

1100b

1100c

1100d

1100e

DEVICE AND ARRANGEMENT FOR CONTROLLING AN ELECTROMAGNETIC WAVE, METHODS OF FORMING AND OPERATING THE SAME

CROSS-REFERENCE TO RELATED APPLICATION

This application claims the benefit of priority of Singapore application No. 10201600998W filed on Feb. 11, 2016, the contents of it being hereby incorporated by reference in its entirety for all purposes.

TECHNICAL FIELD

Various aspects of this disclosure relate to devices and/or arrangements for controlling electromagnetic waves. Various aspects of this disclosure relate to methods of forming devices and/or arrangements for controlling electromagnetic waves, and/or methods of operating devices and/or arrangements to control electromagnetic waves.

BACKGROUND

Reconfigurable devices are devices containing one or several parts that can be actively controlled by means of a signal (electrical, optical or of other nature) to modify the optical response for wave front control of amplitude, phase and/or polarization of electromagnetic waves. Reconfigurable devices may include spatial light modulators (SLM). An example of a simple design for manipulation of amplitude is an arrangement including arrays of micro-mirrors that are able to rotate to switch between reflecting and not reflecting the electromagnetic waves. FIG. 1A is a schematic illustrating a micro-electro-mechanical systems (MEMS) based micro-mirror 100a. FIG. 1B is a schematic illustrating another micro-electro-mechanical systems (MEMS) based micro-mirror 100b. FIG. 1C is a scanning electron microscopy (SEM) image 100c showing a top planar view of a micro-mirror. FIG. 1D is a scanning electron microscopy (SEM) image 100d showing a perspective view of a micro-mirror. MEMS-SLMs may work at mid- and far-infrared (IR) frequencies. However, MEMS-SLMs are expensive due to complicated fabrication processes, have a large pixel size that is greater than the electromagnetic wavelength, is limited to amplitude and reflection modulation, and have a moderate response time of about 10 μs.

An example for controlling the phase of electromagnetic waves is realized using an array of cells containing a liquid crystal (LC). A voltage is applied to each individual cell to modify the orientation of the particles comprised in the LC, thus changing the refractive index of the LC. FIG. 2A is a schematic showing a liquid crystal display (LCD) 200a. A LCD may be a liquid crystal on silicon (LCoS) display or a ferroelectric liquid crystal (FLCoS) on silicon display. FIG. 2B is a schematic showing another liquid crystal display (LCD) 200b. FIG. 2C is a scanning electron microscopy (SEM) image 200c of a liquid crystal display (LCD). A LCD may be a liquid crystal on silicon (LCoS) display or a ferroelectric liquid crystal (FLCoS) on silicon display. By varying the refractive index of the LC, the electromagnetic waves experience a different optical path in each cell and thus have different phase shifts. A LC-SLM may be cheap and robust. However, for reflection devices, the cell may need to have a sufficient thickness so that an electromagnetic wave passing through the cell experiences at least about half a wavelength shift due to the change in refractive index. Alternatively, for transmission devices, the cell may be required to have a sufficient thickness of at least one wavelength shift due to the change in refractive index. Another limitation is the relatively large lateral size of one pixel, which may be of several microns or several tens of microns, and which may limit the resolution of existing SLMs. Additionally, LC-SLMs may have an operating spectral range that is limited by LC transparency, and may operate at visible to near-IR frequencies only. The response time may not be good (about 100-1000 μs). FIG. 2D is a chart 200d showing the operating spectral range of Hamamatsu™ phase spatial light modulators (liquid crystal on silicon spatial light modulators).

Magneto-optical spatial light modulators (MO-SLMs) may have good response time in the range of nanoseconds, and spin transfer torque (STT) types may potentially achieve sub-wavelength sizes. However, MO-SLMs have a spectral range that is limited to frequencies of suitable MO materials. Further, MO-SLMs are not based on a mature technology.

Electro-optical spatial light modulators (EO-SLMs) may have good response time in the range of nanoseconds. However, EO-SLMs have a spectral range that is limited to frequencies of suitable EO materials. Further, EO-SLMs are often bulky.

Acousto-optical spatial light modulators (AO-SLMs) may work at infrared (IR) frequencies and have moderate to good response time of about 100 ns, but require higher operating voltages, and are often bulky.

SUMMARY

Various embodiments may provide a device for controlling an electromagnetic wave according to various embodiments. The device may include a medium. The device may further include an array of elements in contact with the medium and may be configured to receive the electromagnetic wave. Each element of the array of elements may include a phase change material configured to switch, at least, from a first state to a second state in response to an external input, thereby changing an optical property of the respective element to control the electromagnetic wave.

Various embodiments may provide a method of forming a device for controlling an electromagnetic wave according to various embodiments. The method may include providing a medium. The method may also include forming an array of elements in contact with the medium and configured to receive the electromagnetic wave. Each element of the array of elements may include a phase change material configured to switch, at least, from a first state to a second state in response to an external input, thereby changing an optical property of the respective element to control the electromagnetic wave.

Various embodiments may provide a method of operating a device to control an electromagnetic wave according to various embodiments. The method may include providing or directing the electromagnetic wave to the device. The device may include a medium. The device may also include an array of elements in contact with the medium and configured to receive the electromagnetic wave. Each element of the array of elements may include a phase change material. The method may also include applying the external input to switch the phase change material from, at least, a first state to a second state, thereby changing an optical property of the respective element to control the electromagnetic wave received by the array of elements.

Various embodiments may provide an arrangement configured to control an electromagnetic wave. The arrangement may include a device. The device may include a medium. The device may also include an array of elements in contact with the medium and configured to receive the electromagnetic wave. The arrangement may additionally include an electromagnetic wave source configured to provide the electromagnetic wave to the array of elements. Each element of the array of elements may include a phase change material configured to switch from, at least, a first state to a second state in response to an external input, thereby changing an optical property of the respective element to control the electromagnetic wave.

Various embodiments may provide a method of forming an arrangement. The method may include providing a device configured to control an electromagnetic wave. The device may include a medium. The device may also include an array of elements in contact with the medium and configured to receive the electromagnetic wave. Each element of the array of elements may include a phase change material configured to switch from, at least, a first state to a second state in response to an external input, thereby changing an optical property of the respective element to control the electromagnetic wave. The method may additionally include providing an electromagnetic wave source configured to provide the electromagnetic wave to the array of elements.

Various embodiments may provide a method of operating an arrangement to control an electromagnetic wave. The method may include providing a device configured to control the electromagnetic wave. The device may include a medium. The device may also include an array of elements in contact with the medium and configured to receive the electromagnetic wave. Each element of the array of elements may include a phase change material. The method may also include providing an electromagnetic source to provide the electromagnetic wave to the device. The method may further include applying the external input to switch the phase change material from, at least, a first state to a second state, thereby changing an optical property of the respective element to control the electromagnetic wave received by the array of elements.

BRIEF DESCRIPTION OF THE DRAWINGS

The invention will be better understood with reference to the detailed description when considered in conjunction with the non-limiting examples and the accompanying drawings, in which:

FIG. 1A is a schematic illustrating a micro-electro-mechanical systems (MEMS) based micro-mirror 100a.

FIG. 4 is a schematic illustrating a method of forming a device for controlling an electromagnetic wave according to various embodiments.

FIG. 5 is a schematic illustrating a method of operating a device to control an electromagnetic wave according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or device/arrangement are analogously valid for the other methods or devices/arrangements. Similarly, embodiments described in the context of a method are analogously valid for a device/arrangement, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The device or arrangement as described herein may be operable in various orientations, and thus it should be understood that the terms "top", "bottom", etc., when used in the following description are used for convenience and to aid understanding of relative positions or directions, and not intended to limit the orientation of the device or arrangement.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1A:
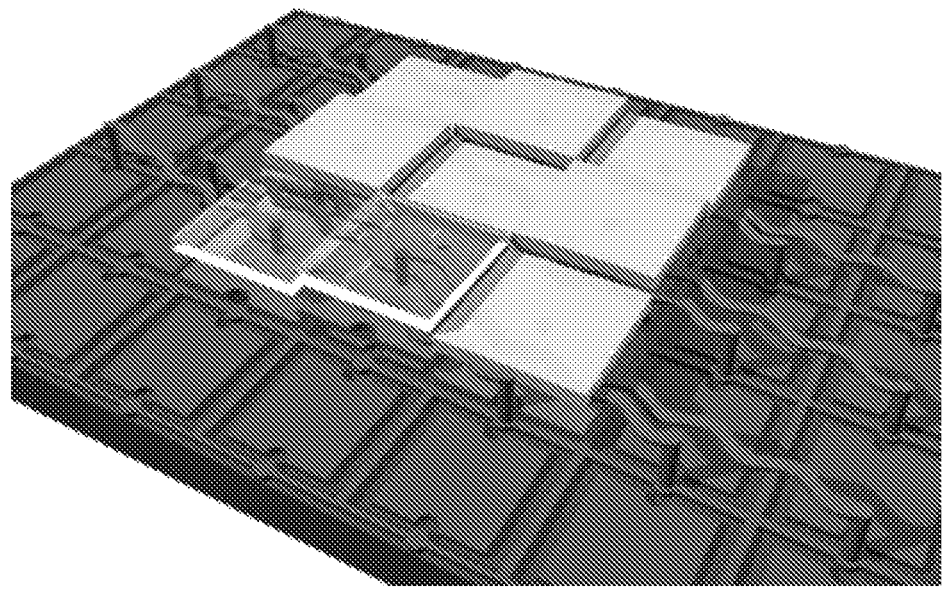
Figure 1B:
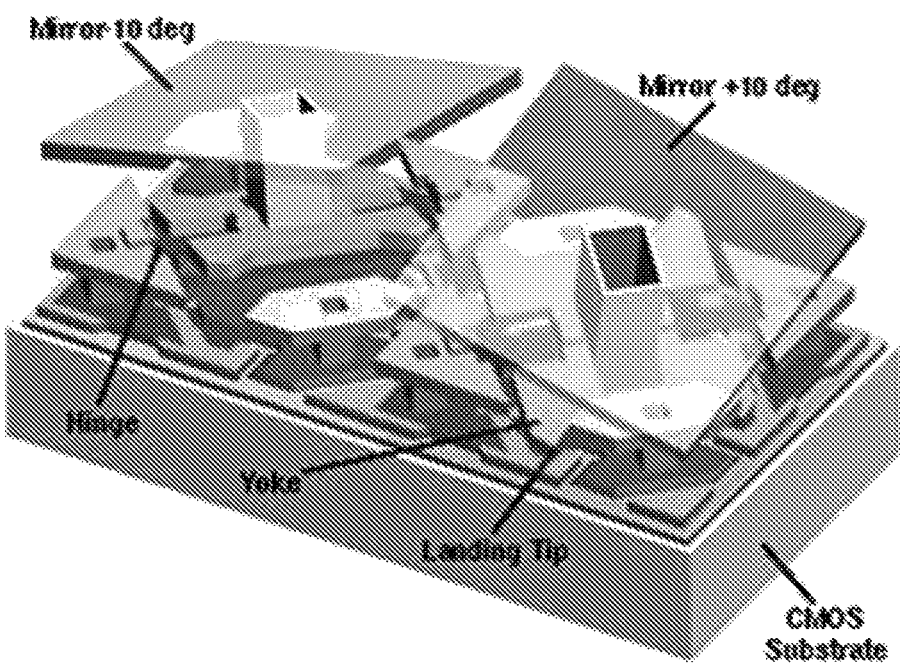
FIG. 1B is a schematic illustrating another micro-electromechanical systems (MEMS) based micro-mirror.
Figure 1C:
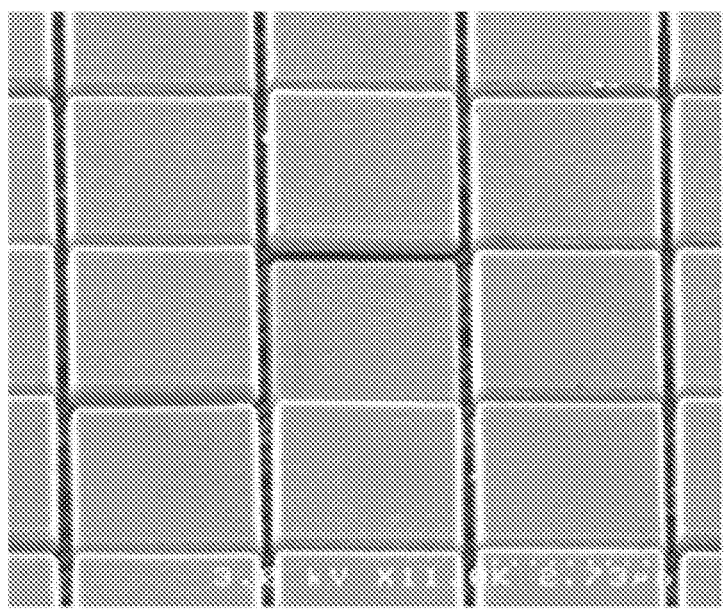
FIG. 1C is a scanning electron microscopy (SEM) image showing a top planar view of a micro-mirror.
Figure 1D:
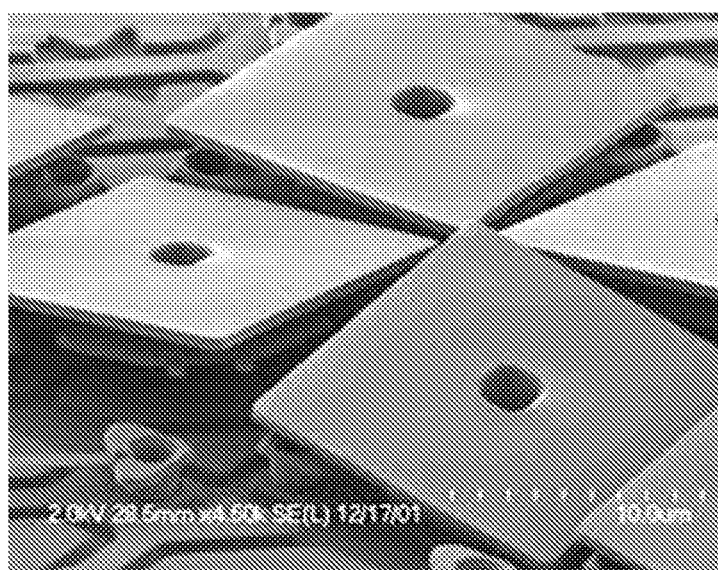
FIG. 1D is a scanning electron microscopy (SEM) image showing a perspective view of a micro-mirror.
Figure 2A:
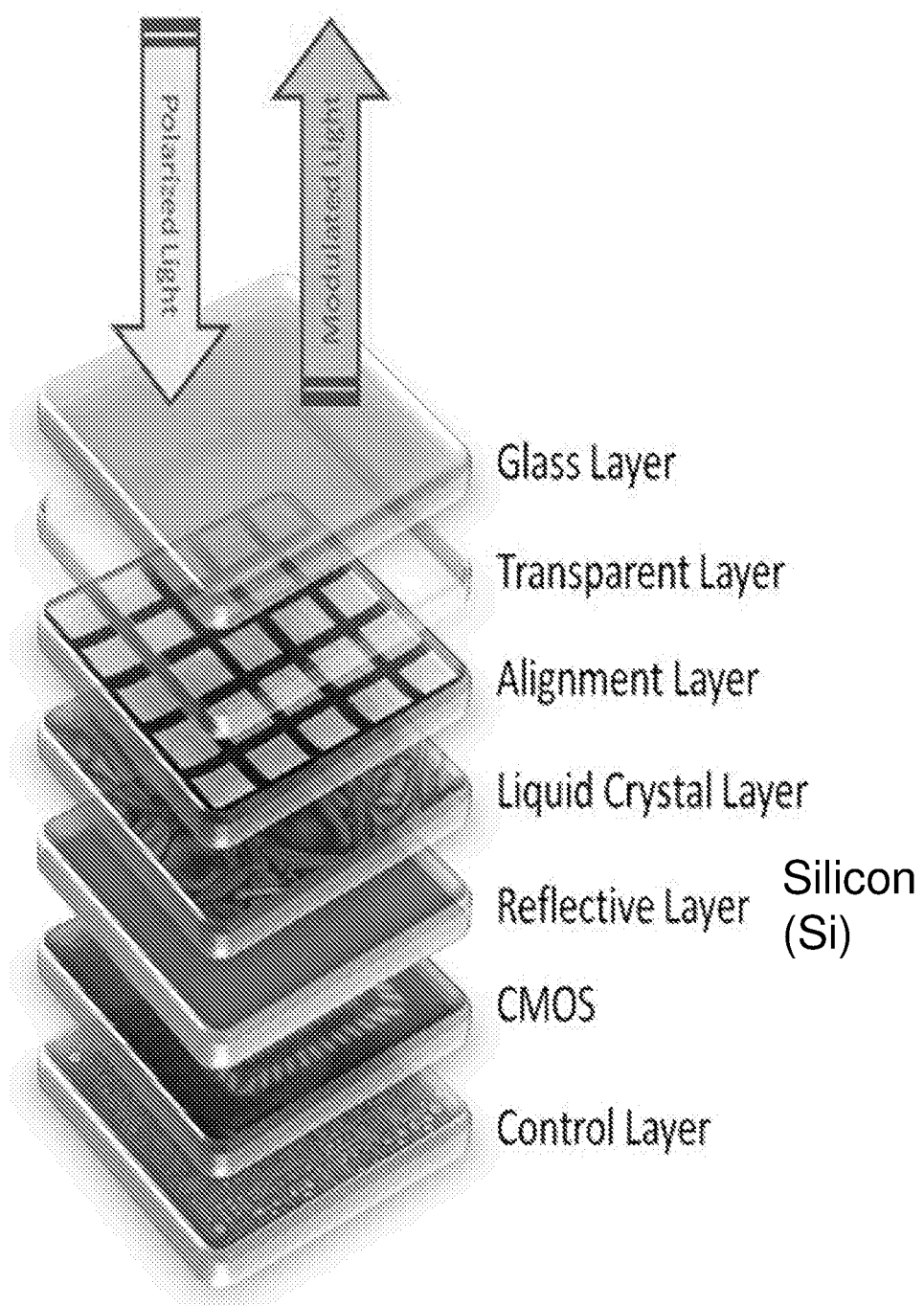
FIG. 2A is a schematic showing a liquid crystal display (LCD). A LCD may be a liquid crystal on silicon (LCoS) display or a ferroelectric liquid crystal (FLCoS) on silicon display.
Figure 2B:
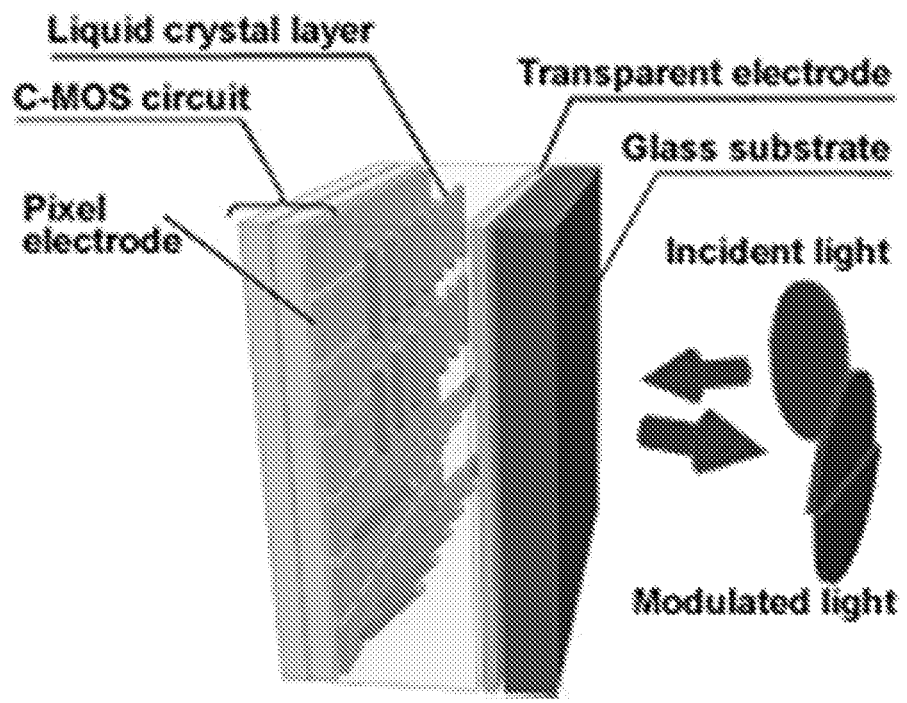
FIG. 2B is a schematic showing another liquid crystal display (LCD).
Figure 2C:
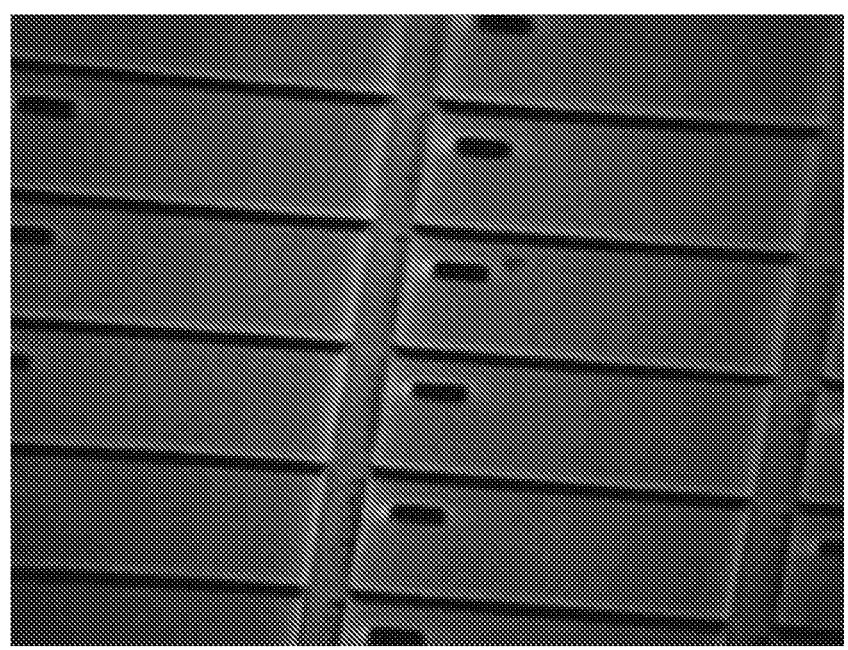
FIG. 2C is a scanning electron microscopy (SEM) image of a liquid crystal display (LCD).
Figure 2D:
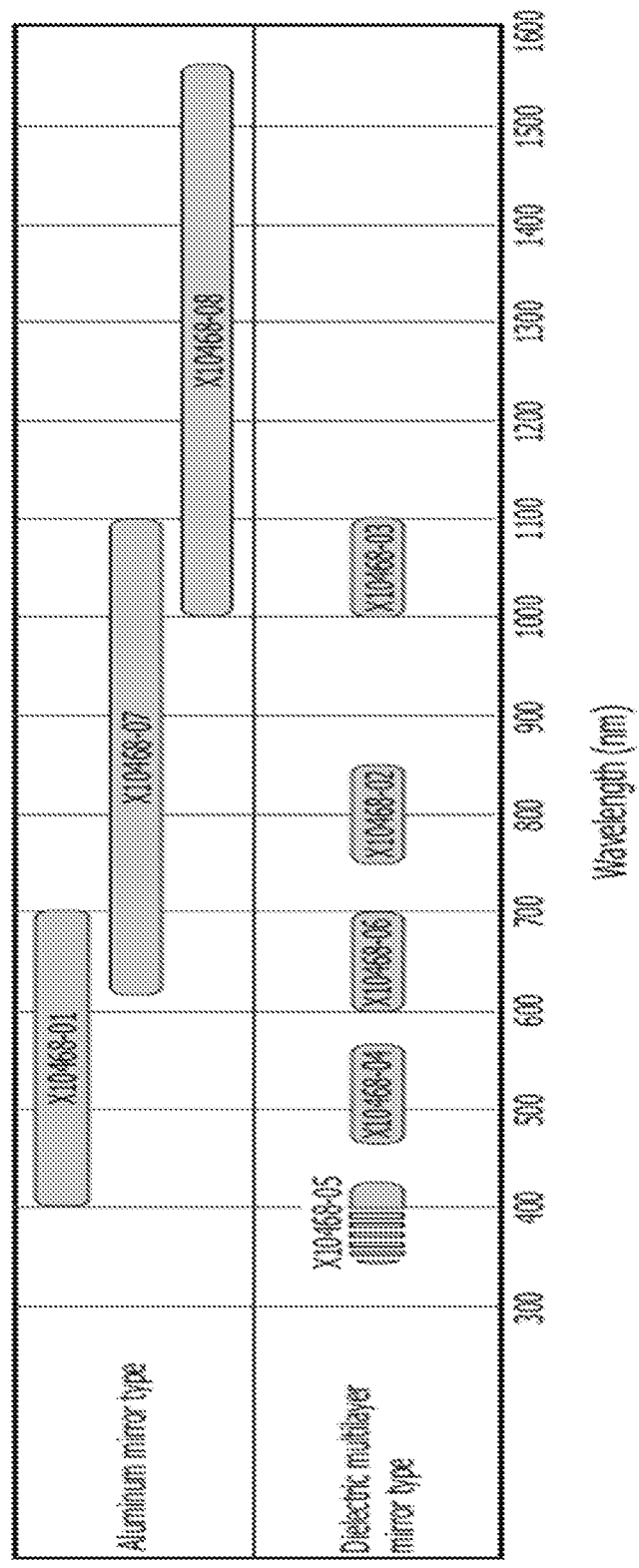
FIG. 2D is a chart showing the operating spectral range of Hamamatsu™ phase spatial light modulators (liquid crystal on silicon spatial light modulators).
Figure 3:
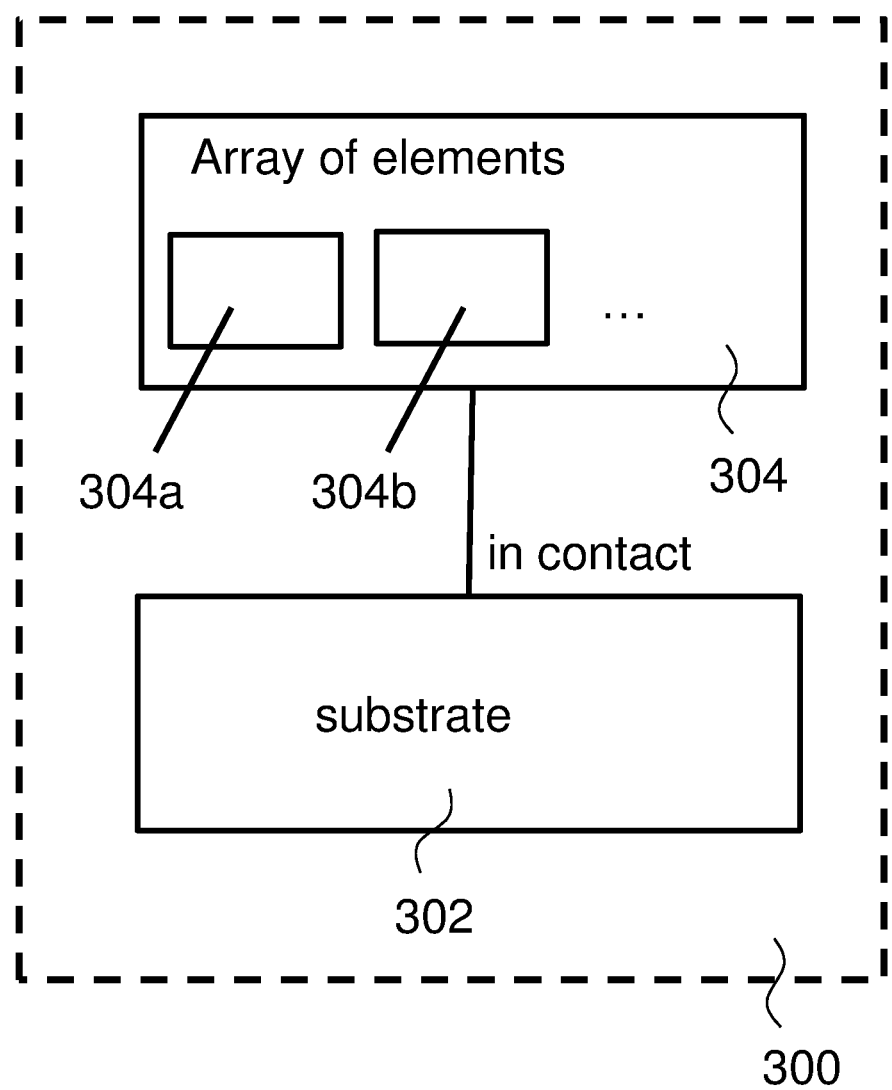
FIG. 3 is a schematic illustrating a device for controlling an electromagnetic wave according to various embodiments.

FIG. 3 is a schematic illustrating a device 300 for controlling an electromagnetic wave according to various embodiments. The device 300 may include a medium 302. The device 300 may further include an array 304 of elements 304a, 304b etc. in contact with the medium 302 and may be configured to receive the electromagnetic wave. Each element 304a, 304b etc. of the array of elements 304 may include a phase change material configured to switch from, at least, a first state to a second state in response to an external input, thereby changing an optical property of the respective element 304a, 304b etc. to control the electromagnetic wave.

In other words, the device 300 may include a medium 302 with an array 304 of elements 304a, 304b etc. which contain a phase change material. The reconfigurable material may change from, at least, a first state to a second state when an external stimulus is applied to the phase change material. When the phase change material changes from the first state to the second state, the optical property of the phase change material may also change. Accordingly, the external stimulus may be applied to an individual element e.g. 304a to change its optical property. An electromagnetic wave received by the array may thus be controlled or directed by manipulating individual elements 304a, 304b etc.

An element 304a, 304b etc. may be referred to as an antenna. Each element 304a, 304b etc. may be a sub-wavelength element. In other words, each element may have one or more dimensions that are smaller the wavelength of the electromagnetic wave. The elements 304a, 304b etc. may be also referred to as particles. The term "particles" used in the present context may refer to elements of any shape. Each element 304a, 304b etc. may be a nanostructure, such as a nanodisk or a nanocylinder, or any other appropriate shape.

The phase change material may be a reconfigurable material that reversibly changes states in response to an external stimulus. The term "reconfigurable" may refer to a material that have an optical property that changes substantially in response to an external stimulus. The term "non-reconfigurable" may refer to a material that have an optical property that does not change or does not vary substantially in response to the external stimulus.

Various embodiments may address issues faced by conventional devices. Various embodiments may have significant advantages over conventional devices. Various embodiments may for instance be more compact and may have a reduced footprint.

One way to reduce the footprint of the device and achieve smaller thicknesses or better spatial resolution is to make use of resonant sub-wavelength optical elements (antennas), which may naturally provide phase accumulation without introducing additional spatial propagation of the wave. The resonance spectral position of the antenna and the associated phase accumulation are dependent on the geometry and material properties of the antennas and the surrounding environment. Therefore, manipulation of these mentioned parameters may provide a way to control the resonant characteristics.

Currently, there is limited study on the modification of the geometry and constituting material of antennas. There are some studies of geometrically tunable structures. Further, there are other studies regarding modification of the material properties, mainly by injecting charges in semiconductor structures. This approach may be particularly successful in the far-infrared (IR) spectral region. However, only transient charge injection has been demonstrated at optical frequencies. There are also reports pertaining to the tuning of the phase accumulation provided by an antenna by surrounding the elements in a reconfigurable environment. By actively controlling the optical properties of the environment (e.g. using LC), it is possible to modify the resonances of the elements and achieve active control of the phase accumulation of a wave that interacts with the elements.

On the contrary, various embodiments may be based on the optical properties of the resonant elements (antennas). The advantages of this approach may include an increase in the response of the device to the applied signal by making use of the excited resonances and/or the possibility to address the state of single elements, which is not easily attainable when modifying the antennae environment.

Another approach related to phase manipulation is directly writing on continuous films of reconfigurable materials to control the amplitude of an electromagnetic wave. This approach has been widely used in optical memories for data storage. By manipulating the material phase of a portion of the film in a structured manner, it is possible to locally change the reflectivity of the portion. The film may be used as optical data storage based on change in reflectivity. Recently, the approach that is based on the dielectric-to-metal phase transitions has also been used to write amplitude masks for wave front control, and to generate resonant patterns to produce on-demand transmission and reflection spectra.

Currently, most devices which modify the wave front based on interaction with particles (antennas) involve metallic parts. The reasons are the strong interaction of metals with electromagnetic waves (particularly at optical frequencies), and the ability of metals to confine and enhance the electromagnetic field outside their boundaries, which enhances the interaction of the electromagnetic field with the environment. One drawback of using metals is the associated ohmic losses, which may limit the efficiency of these devices (particularly transmission based devices) due to energy conversion into heat. In addition, the converted heat may also damage the device.

In various embodiments, the elements or antennas themselves, and not the external medium, are reconfigurable. In various embodiments, there may be no need for large field concentrations in the environment and the use of metals may not be required. As a consequence, the energy loss into heat may be avoided or reduced, and the efficiency of the device may be improved. Additionally, various embodiments open the possibility to exploit the unique characteristics of dielectrics, such as the possibility to support magnetic resonances for manipulating the wave front. It has been recently reported that the optical response of subwavelength dielectric particles with high refractive index (>2) may be explained as a combination of electric and magnetic resonances. When the particles have an appropriate aspect ratio, the lowest energy excited electric and magnetic dipole modes may spectrally overlap, leading to radiation interference. In particular, when the resonances have the same amplitude and phase, the radiation pattern may be suppressed in a backward direction, and these particles may behave as Huygens' sources. It has been demonstrated that sub-diffractive arrangements of such particles may perfectly transmit an incoming electromagnetic wave but, at the same time, may alter the phase of the electromagnetic wave, leading to efficient wave front manipulation in transmission.

Currently, there is no satisfactory technological solution for the reconfigurable phase manipulation at mid-IR frequencies. This range of frequencies may be of great interest in aerospace applications such as Light Detection And Ranging (LIDAR) due to the atmospheric transparency window, as well as in remote sensing in identifying chemicals based on their characteristic IR-absorption spectra. While there has been a tremendous advance in radiation sources and detectors, current mid-IR wave front modulators still have serious drawbacks that limit their applicability. The current modulators are mainly either based on micromirrors, which are very fragile, only modulate amplitude, and have pixel sizes exceeding the wavelength of the electromagnetic wave, or based on acousto-optical effects, which require high operational voltages and are very bulky, or based on the quantum confined Stark shift (i.e., a modulation of the absorption characteristics of materials), which require rather sophisticated materials and offer a poor solution for phase modulation due to the associated absorption in the material.

Various embodiments may combine the mentioned property of high-index dielectrics to behave as ideal Huygens's sources and the ability to control the optical properties via material phase manipulation to provide a solution. Various embodiments may additionally operate in transmission.

In various embodiments, the medium 302 may be a substrate. In various embodiments, the array 304 of elements 304a, 304b etc. may be on the substrate 302. In various other embodiments, the medium 302 may be a superstrate. In various embodiments, the array 304 of elements 304a, 304b etc. may be embedded or at least partially covered by the superstrate 302.

The medium 302 may include a dielectric. The dielectric may be of a lower refractive index compared to the phase change material. The medium 302 may be non-reconfigurable.

In various embodiments, the medium 302 may be a substrate, and the device 300 may further include a cover layer covering the array 304 of elements 304a, 304b etc. The cover layer may be non-reconfigurable.

The external input may be an electrical signal, a thermal signal or an optical signal.

In various embodiments, the first state may be an amorphous phase and the second state may be a crystalline phase or may be a phase that is at least partially crystallized.

In the current context, a phase change material may refer to any material configured to undergo a change in the material phase or state upon application of an external input. In other words, the phase change material may change from a first material phase or state to a second material phase or state upon application of the external input to the phase change material.

In various embodiments, the phase change material may be configured to switch between the first state, the second state, and additional states in response to external inputs. For instance, the phase change material may be configured to switch from the second state to a third state in response to a further external input, thereby further changing the optical property of the respective element 304a, 304b etc. In such a scenario, the first state may be an amorphous phase, the second state may be an intermediate phase, and the third state may be a crystalline phase. However, in various embodiments, the phase change material may not be limited to three states. The phase change material may be configured to switch to an additional state or additional states in response to an additional external input or additional external inputs.

The array 304 of elements 304a, 304b etc. may be a periodic and/or ordered array. The array 304 may be a two-dimensional array. The elements 304a, 304b etc. may be arranged in any Bravais lattice, such as a regular square lattice.

In various embodiments, the electromagnetic wave may be an infrared (IR) light. The electromagnetic wave may have a wavelength in the mid infrared range. The electromagnetic wave may have a wavelength of any value in a range of about 3 µm to about 40 µm, e.g. about 3 µm to about 5 µm. Alternatively, the electromagnetic wave may have a wavelength in the near infrared range, e.g. from about from 700 nm to about 2.5 µm. In various alternate embodiments, the electromagnetic wave may be visible light.

In various embodiments, a period between neighbouring elements 304a, 304b etc. of the array 304 of elements 304a, 304b etc may be smaller than a wavelength of the electromagnetic wave. In various embodiments, a period between neighbouring elements 304a, 304b etc. of the array 304 of elements 304a, 304b etc. may be below 5 µm or below 2 µm.

In various embodiments, controlling the electromagnetic wave may include adjusting the scattering of the electromagnetic wave.

In various embodiments, the electromagnetic wave may be controlled by changing or varying at least one property of the electromagnetic wave selected from a group consisting of phase, amplitude, and polarization.

The optical property of the respective element 304a, 304b etc. may be a refractive index of the respective element 304a, 304b etc.

The phase change material may be referred to as a chalcogenide material. The phase change material may be $Ge_2Sb_2Te_5$ (GST).

In various embodiments, an arrangement may be provided. The arrangement may include a device 300 configured to control an electromagnetic wave and as described herein. The arrangement may also include an electromagnetic wave source configured to provide the electromagnetic wave to the array 304 of elements 304a, 304b etc. Each element 304a, 304b etc. of the array 304 of elements 304a, 304b etc. may include a phase change material configured to switch from, a least, a first state to a second state in response to an external input, thereby changing an optical property of the respective element 304a, 304b etc. to control the electromagnetic wave.

The arrangement may further include a stimulus source which is configured to provide or generate the external input. The arrangement may also include a directing mechanism configured to direct the external inputs to the individual elements 304a, 304b etc. to change the optical property of the individual elements 304a, 304b etc.

In various embodiments, the stimulus source may be a laser source configured to generate a laser beam. In other words, the external input may be a laser beam. The arrangement may further include the laser source configured to emit the laser beam. The arrangement may also include a spatial light modulator configured to direct the laser beam to the respective element 304a, 304b etc. to change the optical property of the respective element 304a, 304b etc.

In various other embodiments, the stimulus source may be a heater configured to generate heat. The external input may be the generated heat. The arrangement may include a thermal conductor configured to conduct the generated heat to each element 304a, 304b etc. to change the optical property of the respective element 304a, 304b etc.

In various other embodiments, the stimulus source may be an electrical source configured to provide a current or a voltage. The external input may be the current or voltage. The arrangement may include a electrical conductor, e.g. an electrode or conductive line, configured to conduct the current or voltage to each element 304a, 304b etc. to change the optical property of the respective element 304a, 304b etc.

FIG. 4 is a schematic 400 illustrating a method of forming a device for controlling an electromagnetic wave according to various embodiments. The method may include, in 402, providing a medium. The method may also include, in 404, forming an array of elements in contact with the medium and configured to receive the electromagnetic wave. Each element of the array of elements may include a phase change material configured to switch from, at least, a first state to a second state in response to an external input, thereby changing an optical property of the respective element to control the electromagnetic wave.

In other words, a method of forming a device as described herein may be provided. The method may include forming elements to form an array in contact with the medium.

In various embodiments, the medium may be a substrate or a superstrate.

In various embodiments, the medium may be a substrate, and the method may also include forming a cover layer to cover the array of elements.

Various embodiments may also provide a method of forming an arrangement. The method may include providing or forming a device as described herein, which is configured to control an electromagnetic wave. The method may further include providing an electromagnetic wave source configured to provide the electromagnetic wave to the array of elements.

The method may additionally include forming or providing a stimulus source.

FIG. 5 is a schematic 500 illustrating a method of operating a device to control an electromagnetic wave according to various embodiments. The method may include, in 502, providing or directing the electromagnetic wave to the device. The device may include a medium. The device may also include an array of elements in contact with the medium and configured to receive the electromagnetic wave. Each element of the array of elements may include a phase change material. The method may also include, in 504, applying the external input to switch the phase change material from, at least, a first state to a second state, thereby changing an optical property of the respective element to control the electromagnetic wave received by the array of elements.

The electromagnetic wave may be controlled by adjusting a phase of the electromagnetic wave from 0 radian to $2\pi$ radians.

Various embodiments may also provide a method of operating an arrangement to control an electromagnetic wave. The method may include providing a device configured to control the electromagnetic wave as described herein. The method may also include providing an electromagnetic source to provide the electromagnetic wave to the device. The method may further include applying the external input to switch the phase change material from, at least, a first state to a second state, thereby changing an optical property of the respective element to control the electromagnetic wave received by the array of elements.

Figure 6A:
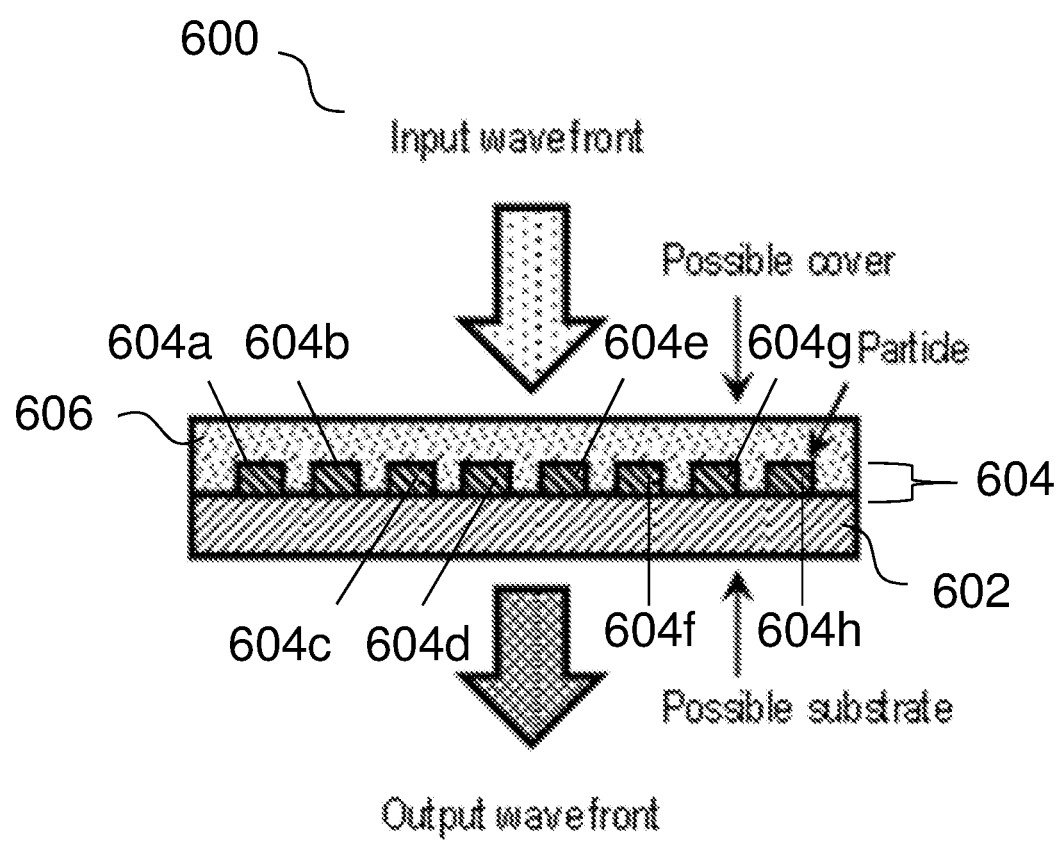
FIG. 6A is a schematic illustrating a device according to various embodiments.

FIG. 6A is a schematic illustrating a device 600 according to various embodiments. The device 600 may include a regular array or arrangement 604 of elements (alternatively referred to as particles) 604a-h over a non-reconfigurable, low index dielectric substrate 602. The device 600 may also include a low index cover layer or superstrate 606 covering the array 604 of elements 604a-h. The elements 604a-h may include a material so that the material phase or state of the material may be manipulated by application of an external input or signal. The external input or signal may be electrical, thermal, and/or optical. As a result of the application of the external input or signal, the material may experience a change in an optical property, such as a refractive index.

The material phases or state of the different elements 604a-h may be collectively or individually manipulated. The optical property of the elements 604a-h may be changed by manipulation of the material phases or states of the elements 604a-h, thus modifying the electromagnetic response. The elements 604a-h may be designed or configured to be resonant at, or close to (within a predetermined range of), a particular frequency or range of frequencies at which wavefront manipulation is desired (the predetermined range may refer to the shift experienced by the resonance when the elements 604a-h are switched), and may be designed or configured so that a change in the material phase or state of the elements 604a-h, e.g. including GST, may provide a change in the electromagnetic wave, such as a change in the phase, amplitude and/or polarization. The predetermined range may be about ±100 nm of the particular frequency or range of frequencies.

Figure 6B:
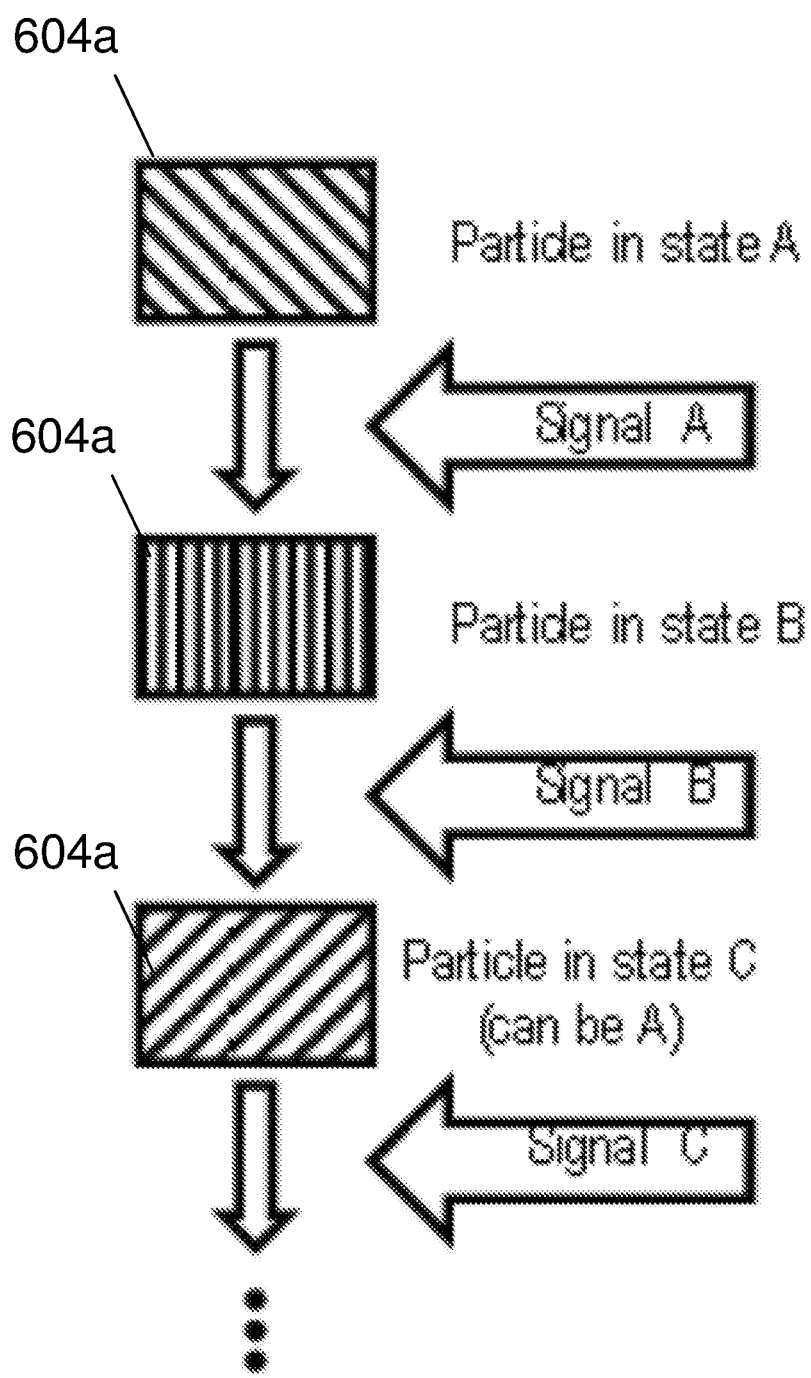
FIG. 6B is a schematic showing the change in material phases or states of an element in response to external inputs or stimuli according to various embodiments.

FIG. 6B is a schematic showing the change in material phases or states of an element 604a in response to external inputs or stimuli according to various embodiments. As shown in FIG. 6B, the element 604a may be initially in state A. Upon application of a first external input or stimulus (alternatively referred to as a signal), the element 604a may change from state A to state B. Upon application of a second external input or stimulus, the element 604a may change from state B to state C.

In various embodiments, the elements 604a-h may be such that the material may be non-metallic in at least one of the states of interest, i.e. the complex refractive index of the material is such that the real part is larger than the imaginary part. The imaginary part of the refractive index (Im(n)) may be small, e.g. <1 or <0.1 or <0.01 or <0.001, and the real part of the refractive index (Re(n)) may be large, e.g. >2. The value of the imaginary part of the refractive index may determine the actual loss of the device 600. The smaller Im(n), the smaller the loss of the device 600. The elements 604a-h including the material may support the electric resonance and/or magnetic resonance at wavelengths that are greater than the physical sizes of the each element 604a-h. In other words, a dimension of each of the plurality of elements 604a-h may be smaller than the wavelength of the electromagnetic wave. Under such conditions, the manipulation of the material phase of the elements 604a-h may result in a change in the resonant characteristics of the array 604, causing a change in the amplitude, polarization and/or phase of the scattered electromagnetic wave.

Figure 6C:
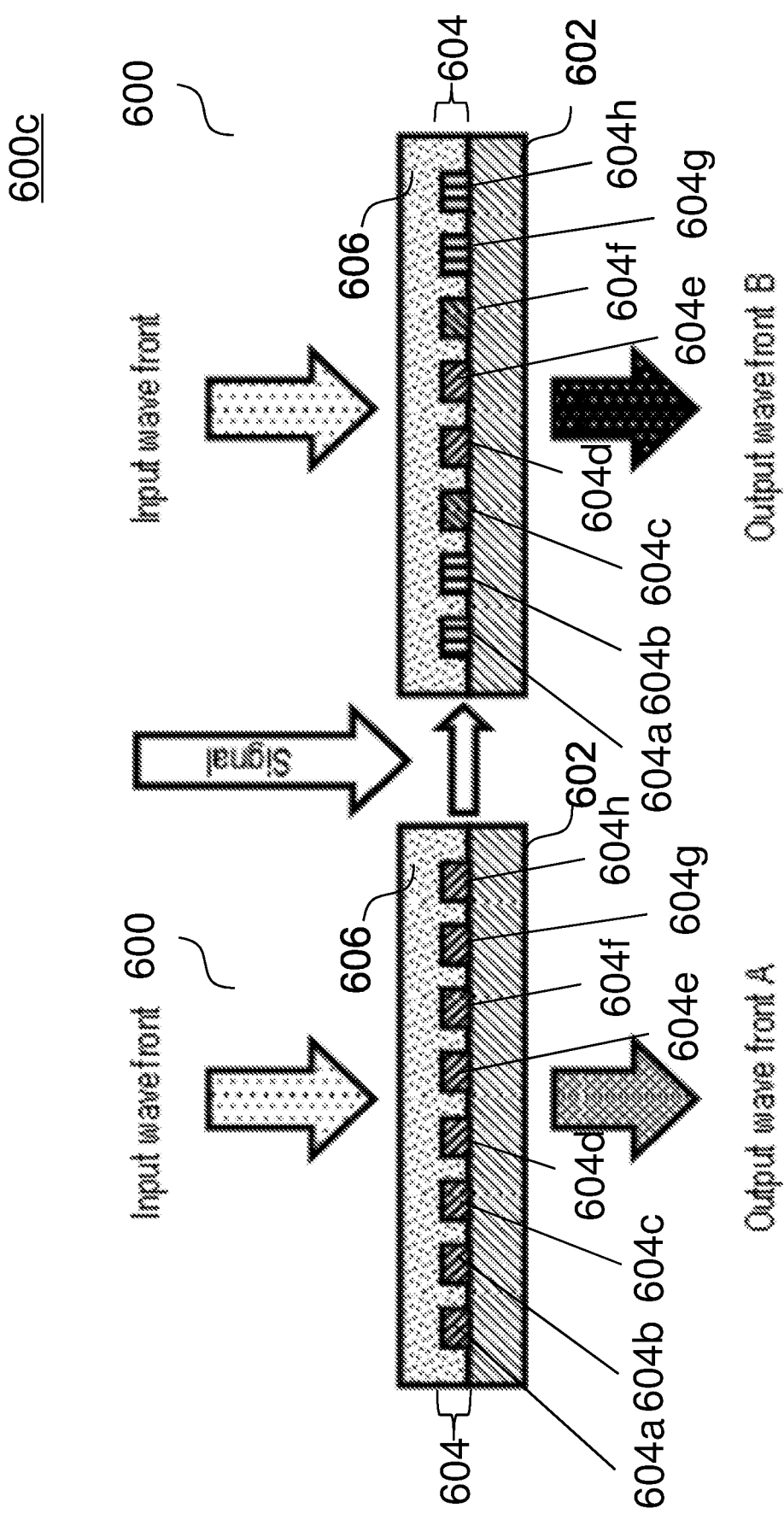
FIG. 6C shows the individual elements of the device according to various embodiments being adjusted by application of external inputs.
Figure 6D:
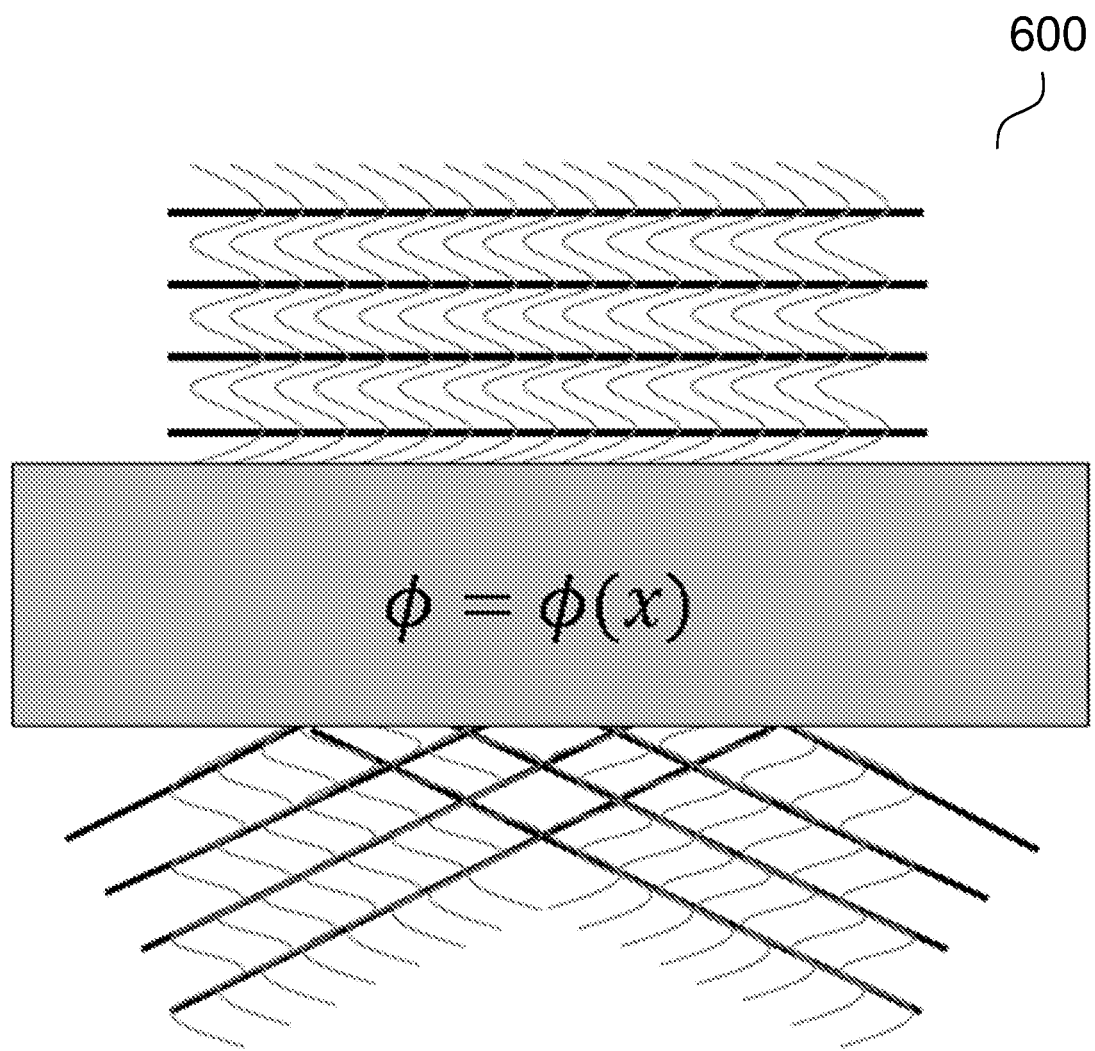
FIG. 6D is a schematic showing the device which induces a position-dependent phase-shift that results in focusing according to various embodiments.

FIG. 6C shows the individual elements 604a-h of the device 600 according to various embodiments being adjusted by application of external inputs. For instance, as shown in FIG. 6C, elements 604a, 604b, 604g, 604h may be changed from the first state to the second state, while elements 604c-f may remain in the first state. Different distributions of scattered fields may thus be generated. The wavefront of a reflected electromagnetic wave and/or the wavefront of a transmitted electromagnetic wave may thus be manipulated. Various embodiments may be used for focusing. FIG. 6D is a schematic showing the device 600 which induces a position-dependent phase-shift that results in focusing according to various embodiments.

Figure 7A:
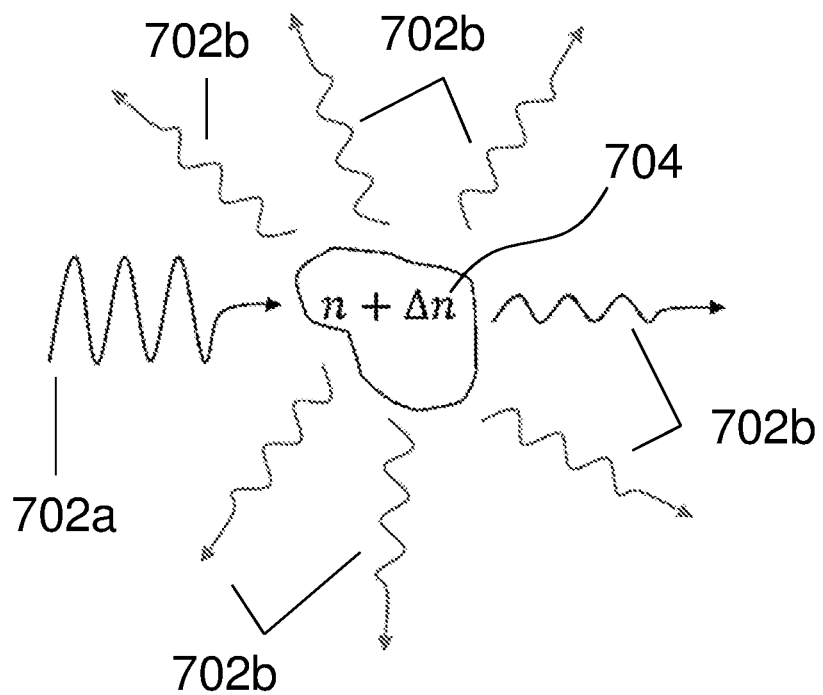
FIG. 7A is a schematic showing an electromagnetic wave incident on a sub-wavelength element according to various embodiments, resulting in scattered electromagnetic waves.
Figure 7B:
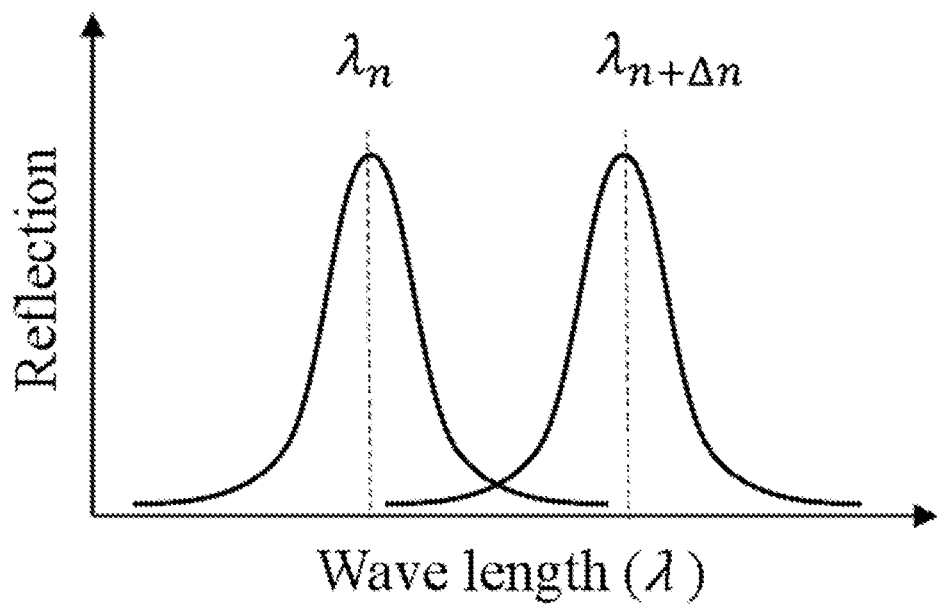
FIG. 7B is a plot of reflection as a function of wavelength ($\lambda$) showing the shift in the resonance wavelength as a result of the field-material interaction according to various embodiments.
Figure 7C:
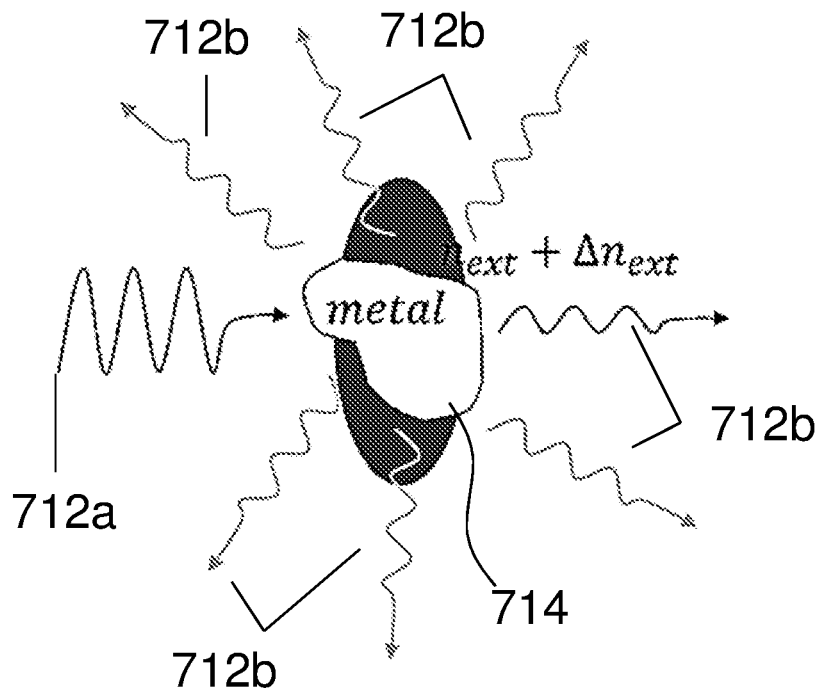
FIG. 7C shows an electromagnetic wave incident on a metal particle, resulting in scattered electromagnetic waves.
Figure 7D:
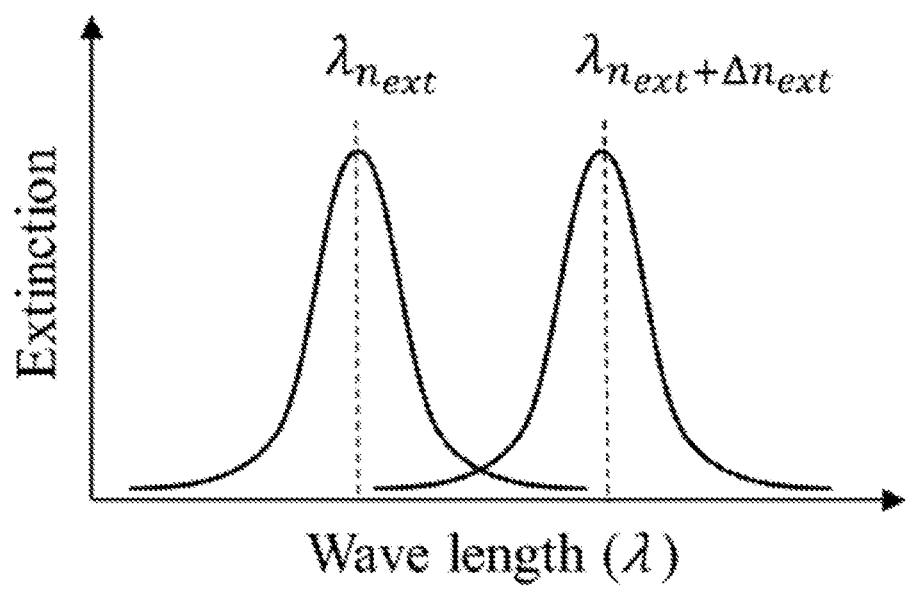
FIG. 7D shows a plot of extinction as a function of wavelength ($\lambda$) showing the loss near the resonant wavelengths and the shift in the resonance wavelength as a result of the field-external medium interaction according to various embodiments.

The use of resonance may have two effects: (i) to introduce a change in the phase and/or amplitude of the electromagnetic wave without requiring longer physical optical paths; and (ii) to enhance the effect of any change in the material property due to the strong field-material interaction. FIG. 7A is a schematic showing an electromagnetic wave 702a incident on a sub-wavelength element 704 according to various embodiments, resulting in scattered electromagnetic waves 702b. FIG. 7B is a plot 710 of reflection as a function of wavelength (λ) showing the shift in the resonance wavelength as a result of the field-material interaction according to various embodiments. Various embodiments may not require the use of metals by using tunable phase change materials in the resonant antennas, thus reducing losses. This is in contrast to previous approaches which use metals to "take the field out of the particle" to enhance interaction with the environment. FIG. 7C shows an electromagnetic wave 712a incident on a metal particle 714, resulting in scattered electromagnetic waves 712b. FIG. 7D shows a plot 720 of extinction as a function of wavelength (λ) showing the loss near the resonant wavelengths and the shift in the resonance wavelength as a result of the field-external medium interaction according to various embodiments.

Figure 7E:
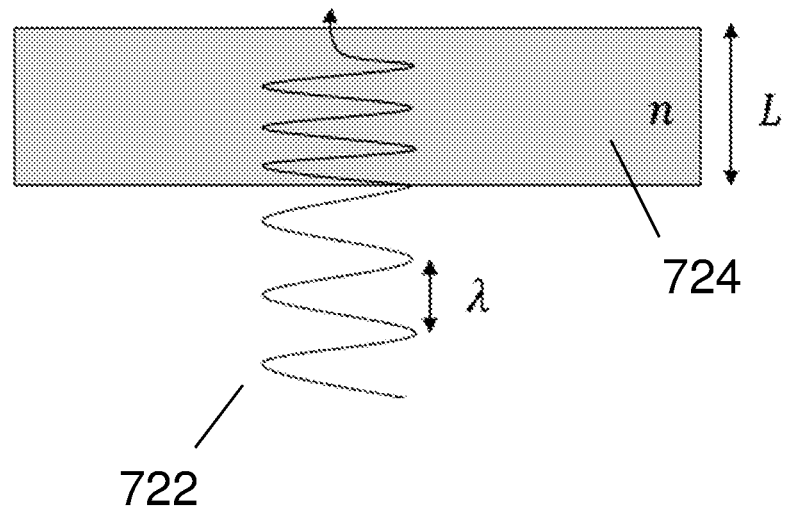
FIG. 7E shows an electromagnetic wave of wavelength $\lambda$ transmitted through a conventional thin film of refractive index n and thickness L.

Both effects may promote the possibility of miniaturization of the device. FIG. 7E shows an electromagnetic wave 722 of wavelength λ transmitted through a conventional thin film 724 of refractive index n and thickness L. The change in phase Δϕ may be provided as below:

$$\frac{\Delta\phi}{2\pi} = \frac{nL}{\lambda} \quad (1)$$

Figure 7F:
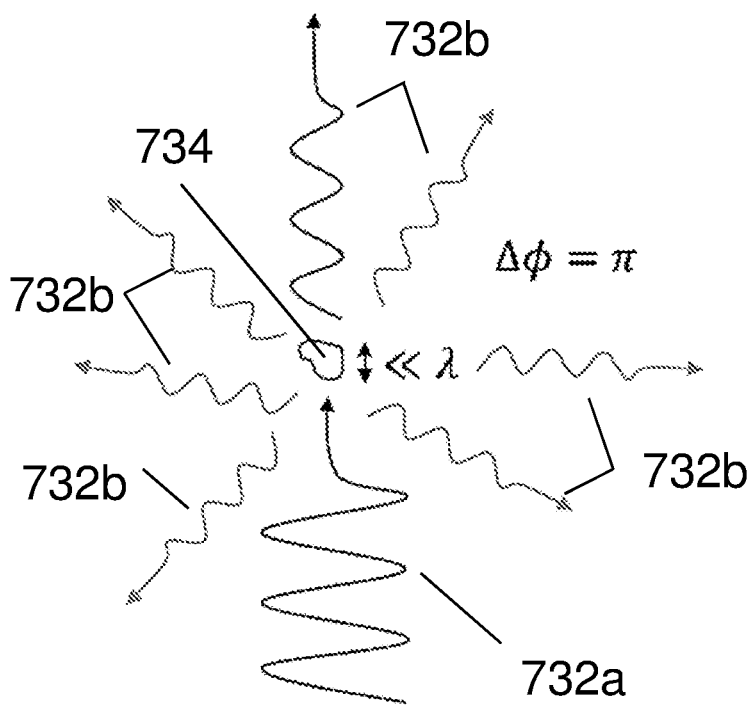
FIG. 7F shows an electromagnetic wave of wavelength $\lambda$ incident on a sub-wavelength element according to various embodiments, resulting in scattered electromagnetic waves.

A large thickness L may be required to cause a required change in phase of π. FIG. 7F shows an electromagnetic wave 732a of wavelength λ incident on a resonant sub-wavelength element 734 according to various embodiments, resulting in scattered electromagnetic waves 732b. As the dimension of the element is much smaller than the wavelength λ of the electromagnetic wave, the change in phase Δϕ may be provided as:

$$\Delta\phi = \pi \quad (2)$$

Figure 7G:
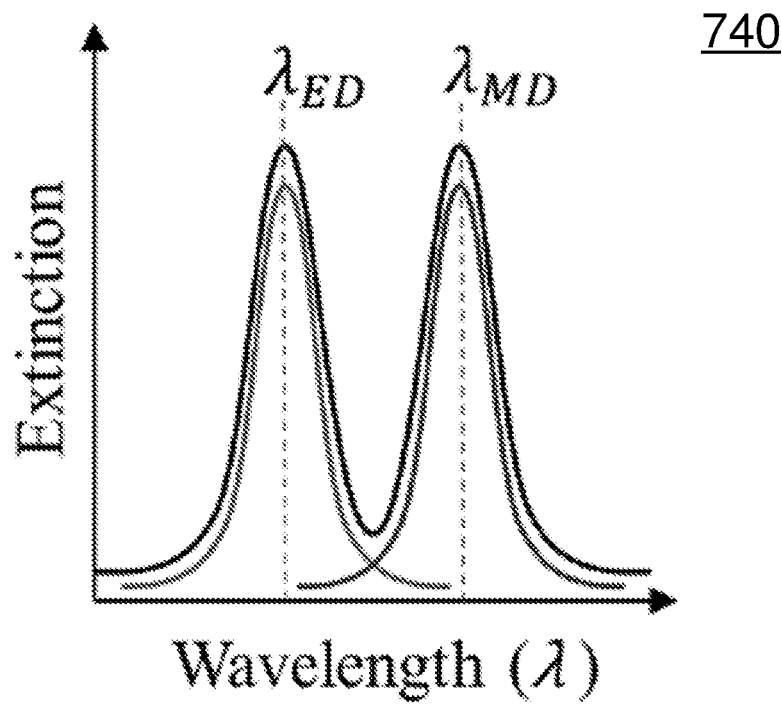
FIG. 7G is a plot of extinction as a function of wavelength ($\lambda$) showing the electric (ED) resonance and the magnetic (MD) resonance of the elements according to various embodiments.
Figure 7H:
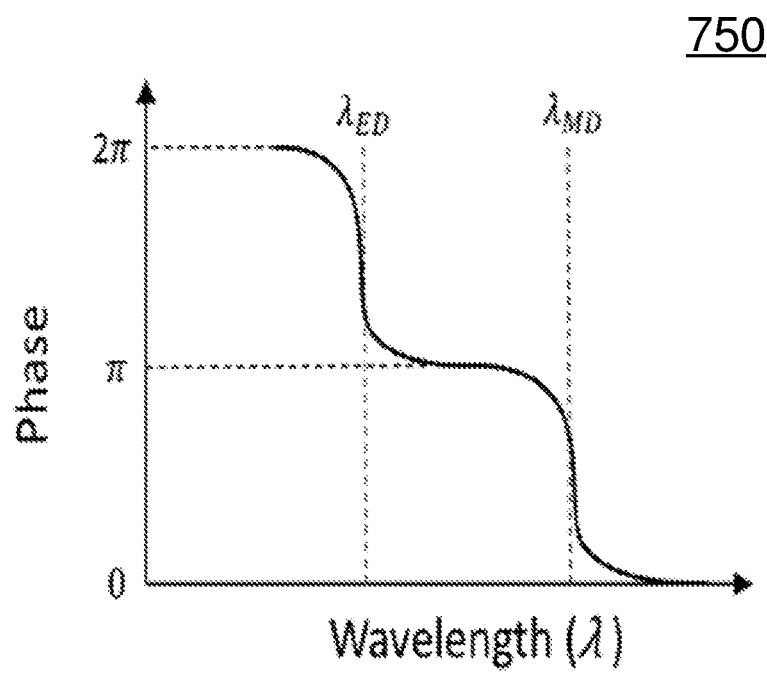
FIG. 7H is a plot of phase as a function of wavelength ($\lambda$) showing the phase shift that may be attributable to the electric (ED) resonance and the magnetic (MD) resonance of the elements according to various embodiments. Dielectric nanoparticles of refractive index greater than 2 (n>2) may support both ED and MD.
Figure 7I:
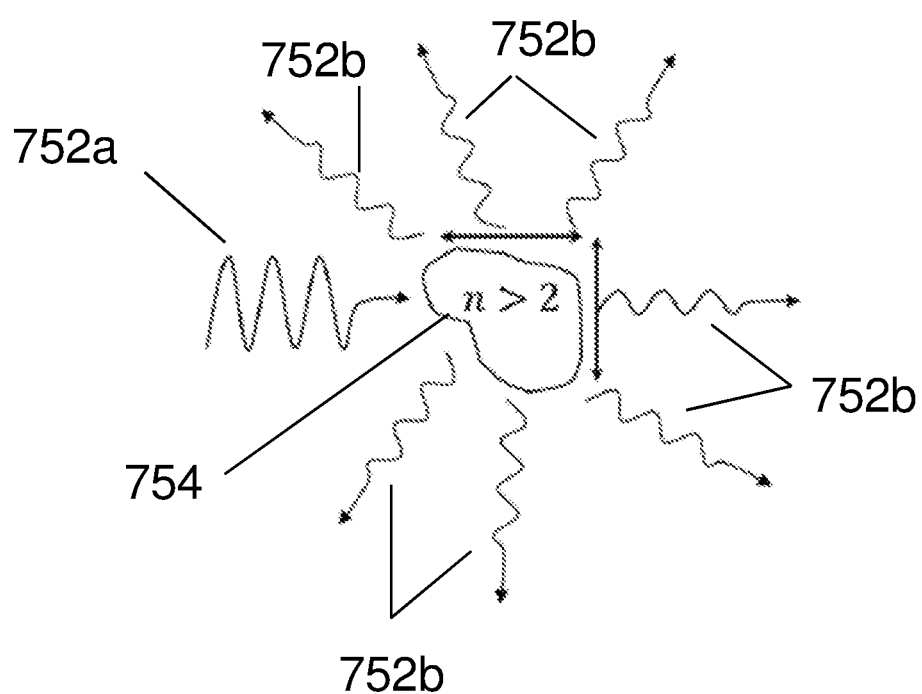
FIG. 7I is a schematic showing an electromagnetic wave incident on a sub-wavelength dielectric nanoparticle of refractive index greater than 2 (n>2) according to various embodiments, resulting in scattered electromagnetic waves.

Phase change materials may allow design of resonant elements or particles that behave as perfect Huygens' sources and allow operation in transmission with 2π radians phase control. FIG. 7G is a plot 740 of extinction as a function of wavelength (λ) showing the electric (ED) resonance and the magnetic (MD) resonance of the elements according to various embodiments. FIG. 7H is a plot 750 of phase as a function of wavelength (λ) showing the phase shift that may be attributable to the electric (ED) resonance and the magnetic (MD) resonance of the elements according to various embodiments. Dielectric nanoparticles of refractive index greater than 2 (n>2) may support both ED and MD. FIG. 7I is a schematic showing an electromagnetic wave 752a incident on a sub-wavelength dielectric nanoparticle 754 of refractive index greater than 2 (n>2) according to various embodiments, resulting in scattered electromagnetic waves 752b.

Figure 7J:
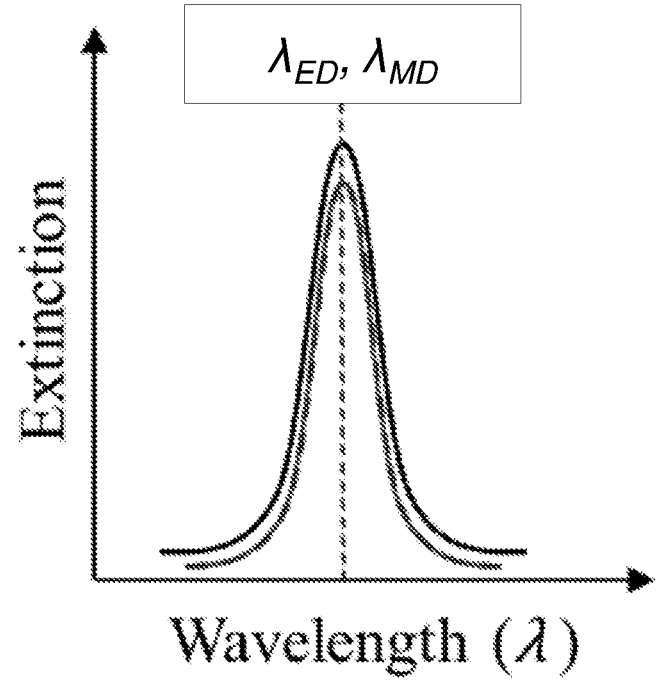
FIG. 7J is a plot of extinction as a function of wavelength ($\lambda$) showing the overlapping of the electric (ED) resonance and the magnetic (MD) resonance according to various embodiments.
Figure 7K:
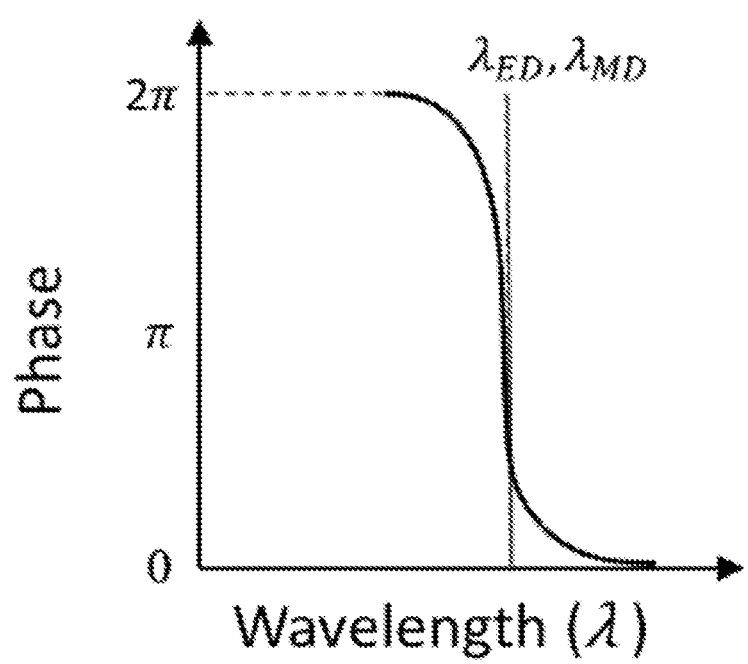
FIG. 7K is a plot of phase as a function of wavelength ($\lambda$) showing a $2\pi$ radians phase shift at the resonant wavelength according to various embodiments.
Figure 7L:
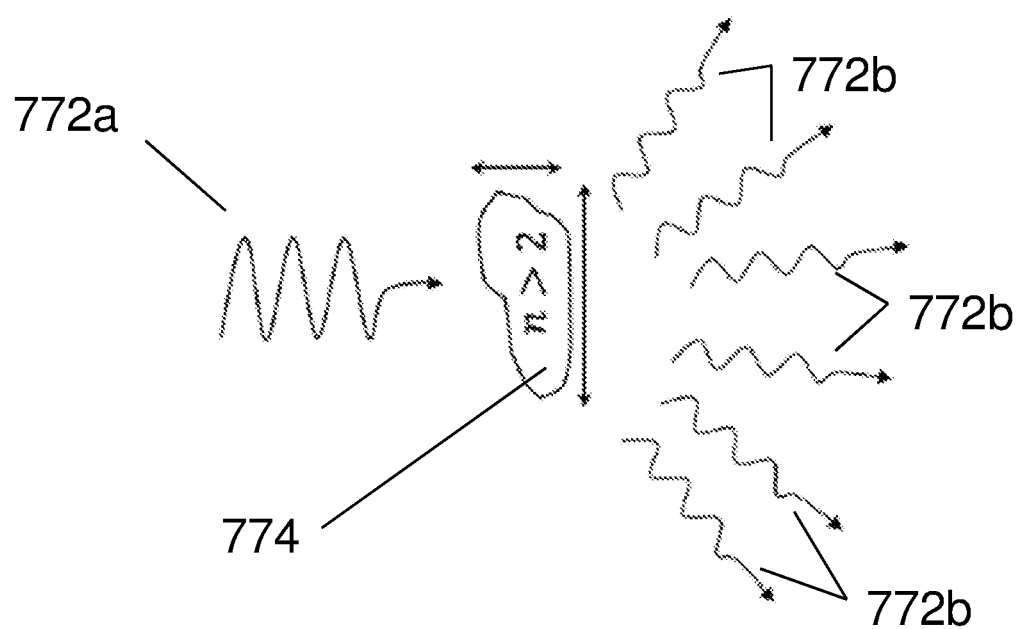
FIG. 7L is a schematic showing an electromagnetic wave incident on a sub-wavelength dielectric nanoparticle of refractive index greater than 2 (n>2), and overlapping electric (ED) resonance and the magnetic (MD) resonance according to various embodiments, resulting in scattered electromagnetic waves showing no backscattering.

By modifying the aspect ratios of the elements or particles, the electric (ED) resonance and the magnetic (MD) resonance may, spectrally, overlap each other, and may result in no backscattering/reflection. FIG. 7J is a plot 760 of extinction as a function of wavelength (λ) showing the overlapping of the electric (ED) resonance and the magnetic (MD) resonance according to various embodiments. FIG. 7K is a plot 770 of phase as a function of wavelength (λ) showing a 2π radians phase shift at the resonant wavelength according to various embodiments. FIG. 7L is a schematic showing an electromagnetic wave 772a incident on a sub-wavelength dielectric nanoparticle 774 of refractive index greater than 2 (n>2) and overlapping electric (ED) resonance and the magnetic (MD) resonance according to various embodiments, resulting in scattered electromagnetic waves 772b showing no backscattering.

Figure 8A:
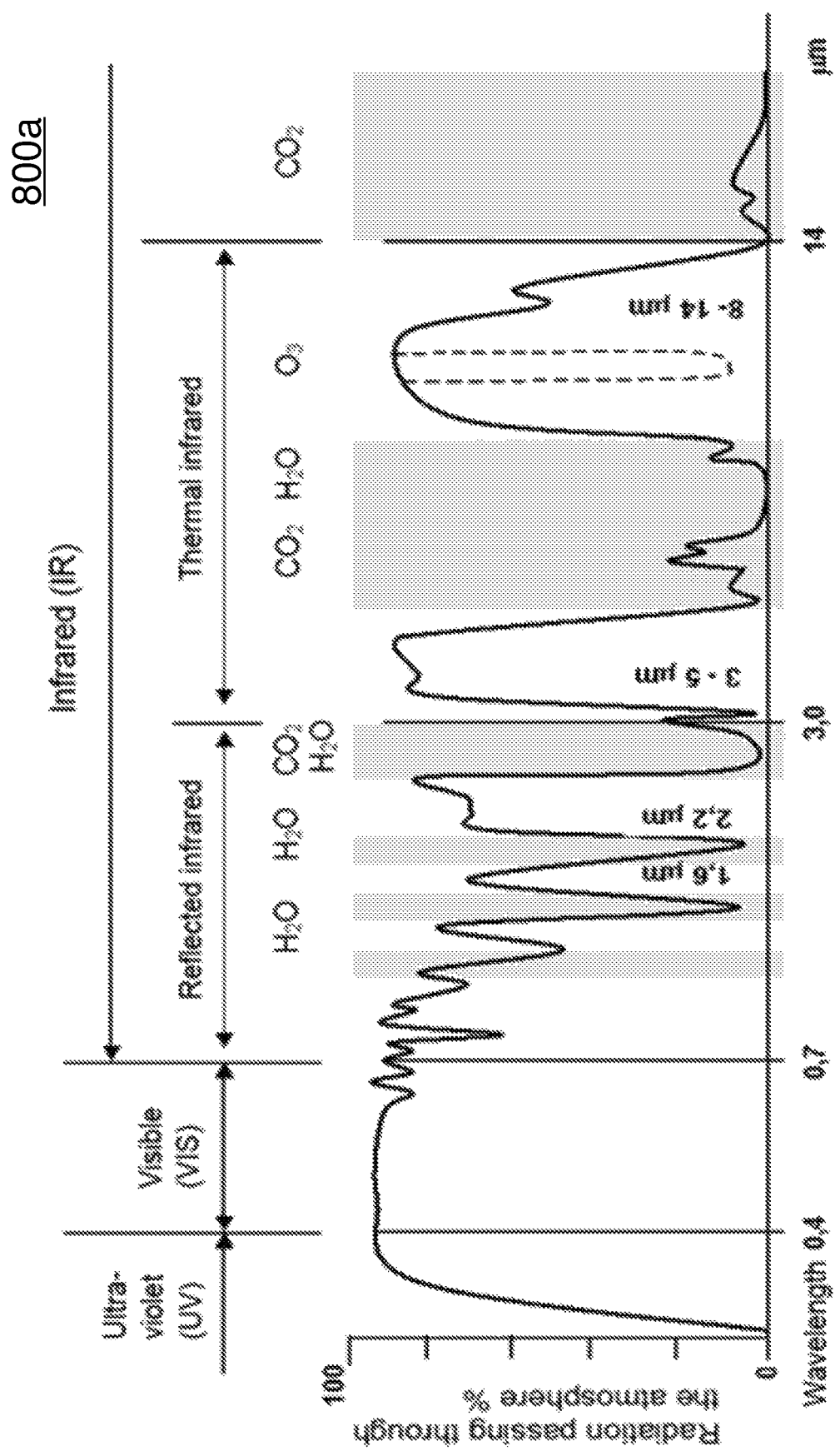
FIG. 8A shows a plot of percentage of radiation passing through the atmosphere (%) as a function of wavelength (micrometer or $\mu$m).
Figure 8B:
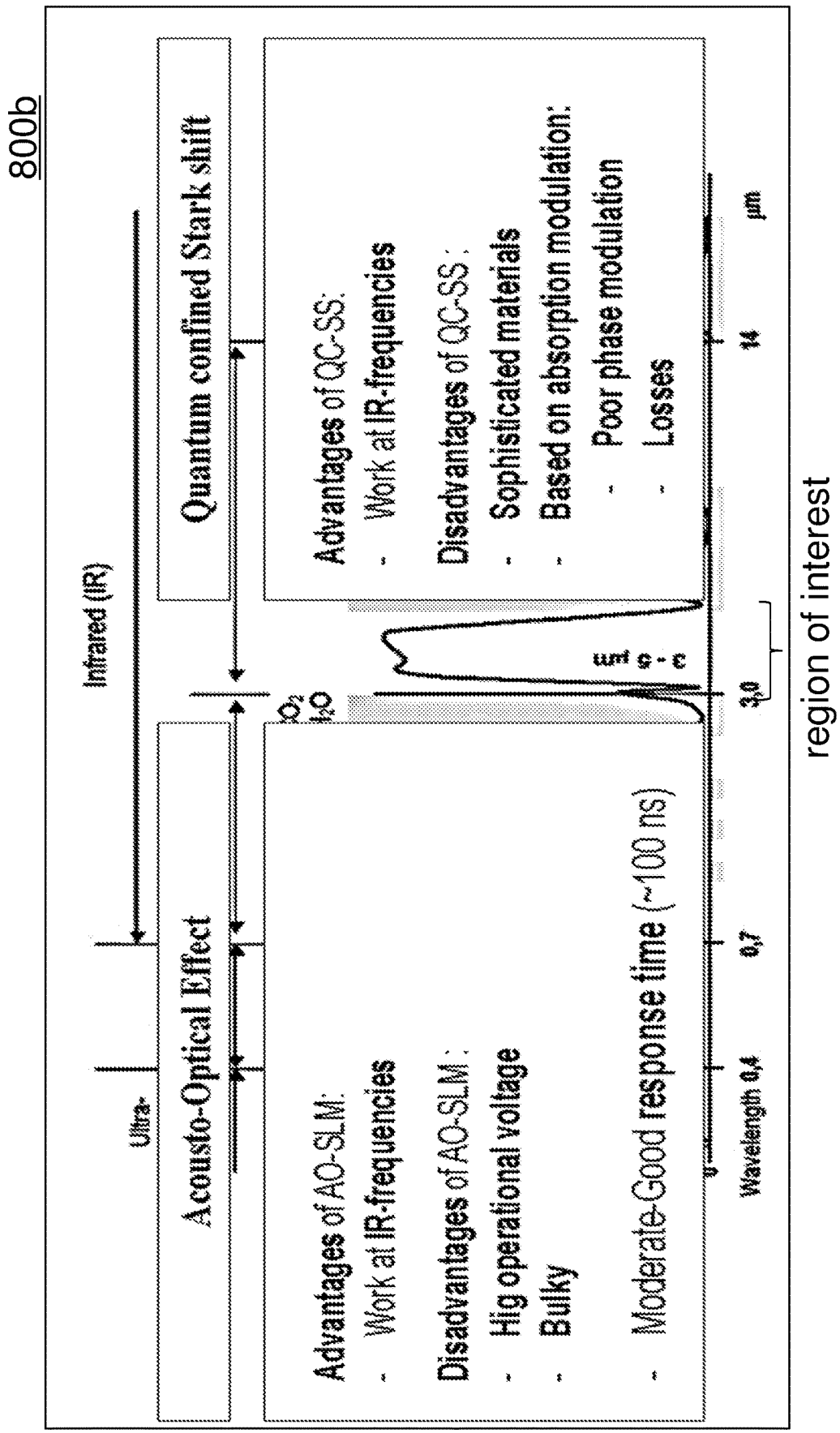
FIG. 8B shows a plot of percentage of radiation passing through the atmosphere (%) as a function of wavelength showing a possible region of interest of the device according to various embodiments.

In various embodiments, the array of elements may be a regular array of $Ge_2Sb_2Te_5$ (GST) resonant nanodisks, which may be used for reconfigurable wave front manipulation in the mid-infrared (IR) frequency range. FIG. 8A shows a plot 800a of percentage of radiation passing through the atmosphere (%) as a function of wavelength (micrometer or μm). FIG. 8B shows a plot 800b of percentage of radiation passing through the atmosphere (%) as a function of wavelength showing a possible region of interest of the device according to various embodiments. The array of GST resonant nanodisks may be configured to target a wavelength on the range of about 3 μm to about 5 μm, which may not be easily absorbed by the environment. Devices making use of the mid-infrared (IR) range may for instance enable pilots to see through strongly scattering optical media such as fog, smoke, and dusty haze. There is a great deal of interest in this range for aerospace applications such as LIDAR, thermal location etc., as well as security, health and environmental applications such as fingerprinting of chemicals via IR absorption spectra.

The wavefront manipulation of an incoming wave may be achieved in transmission (with total transmission values above 50%) by introducing a controllable phase shift. The specific phase shift may be induced locally by each of the individual elements in the array, and may be determined by the material phase of the individual elements. GST may be chosen because it allows material phase manipulation by laser irradiation (which induces a change in the crystallinity of the particles) in sub-microsecond time-scales and may fulfil the requirements with regard to the optical properties (high refractive index and low losses). GST is a widely used material in optical data storage due to the abrupt change in its optical properties (refractive index) as a function of its material phase state, which may change from totally amorphous to totally crystalline.

Figure 9:
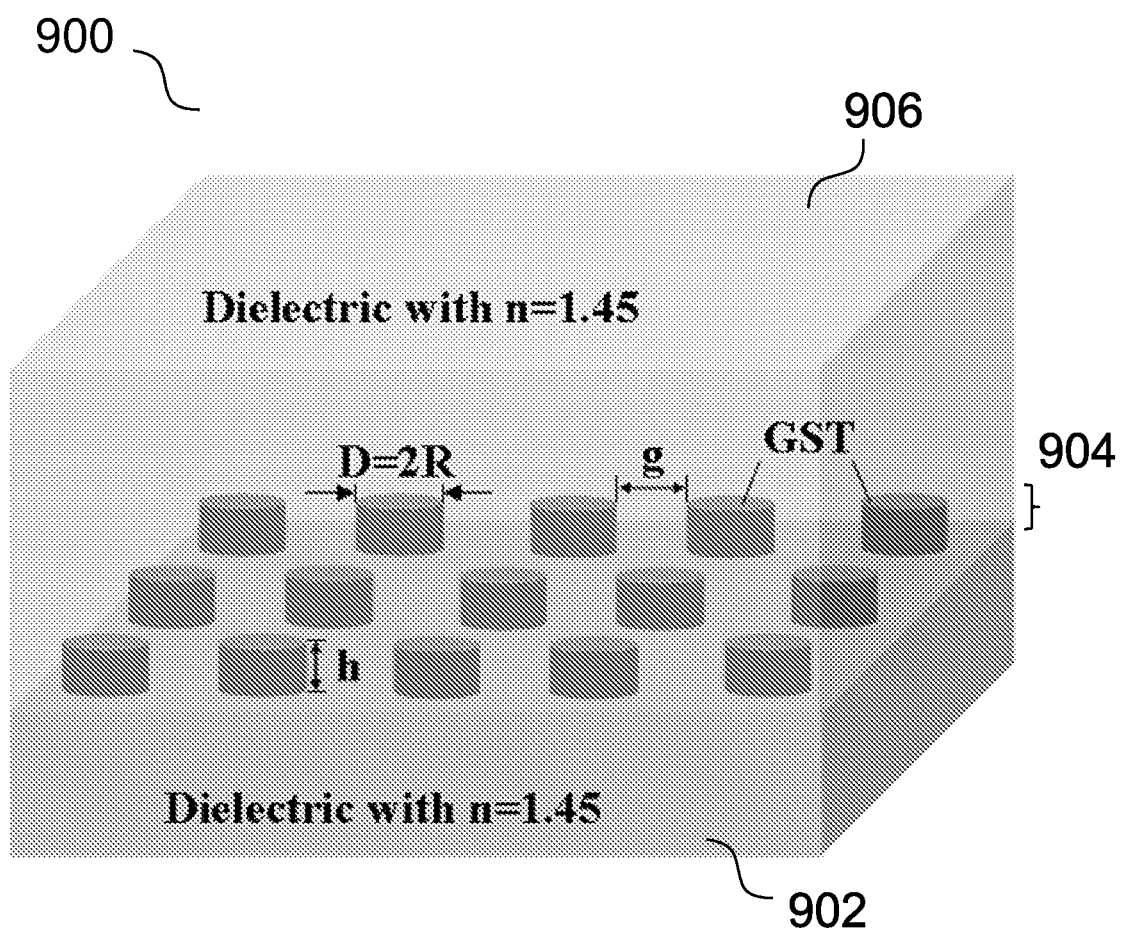
FIG. 9 is a schematic showing a device according to various embodiments.
Figure 10A:
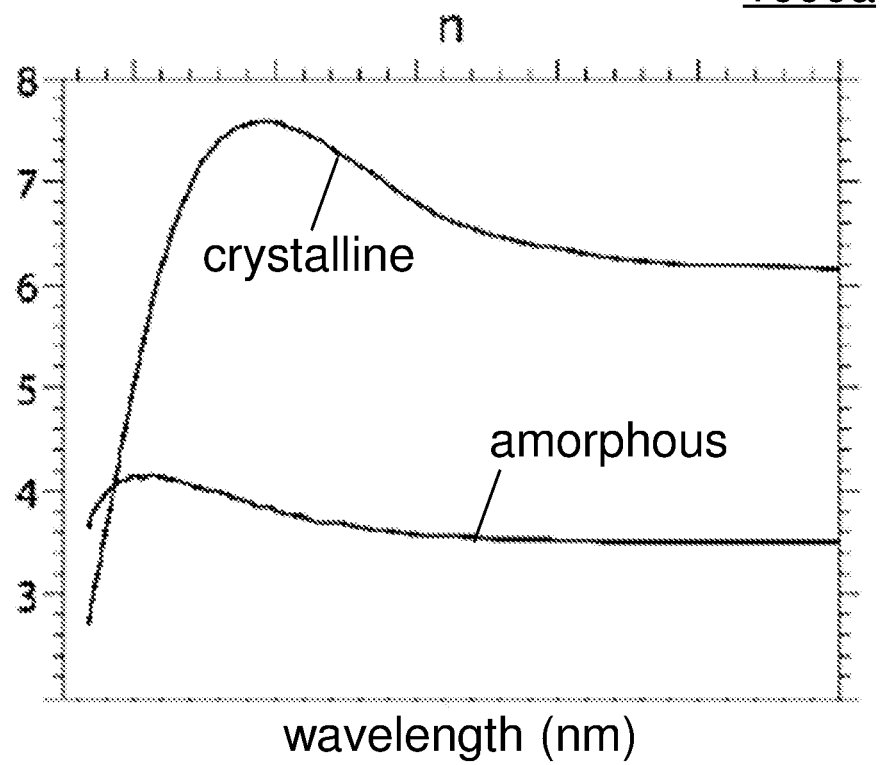
FIG. 10A is a plot of refractive index (n) as a function of wavelength (in nanometers or nm) showing the different refractive indices of the amorphous phase and the crystalline phase of $Ge_2Sb_2Te_5$ (GST) according to various embodiments.
Figure 10B:
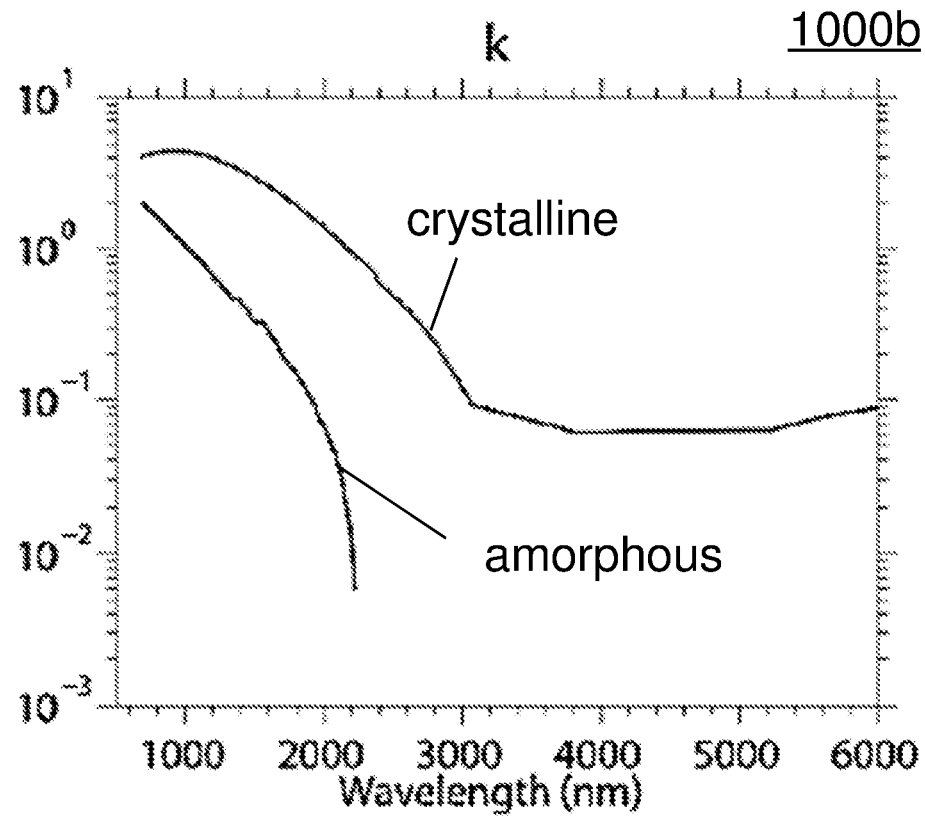
FIG. 10B is a plot of extinction coefficient (k) as a function of wavelength showing the different extinction coefficients of the amorphous phase and the crystalline phase of $Ge_2Sb_2Te_5$ (GST) according to various embodiments.
Figure 10C:
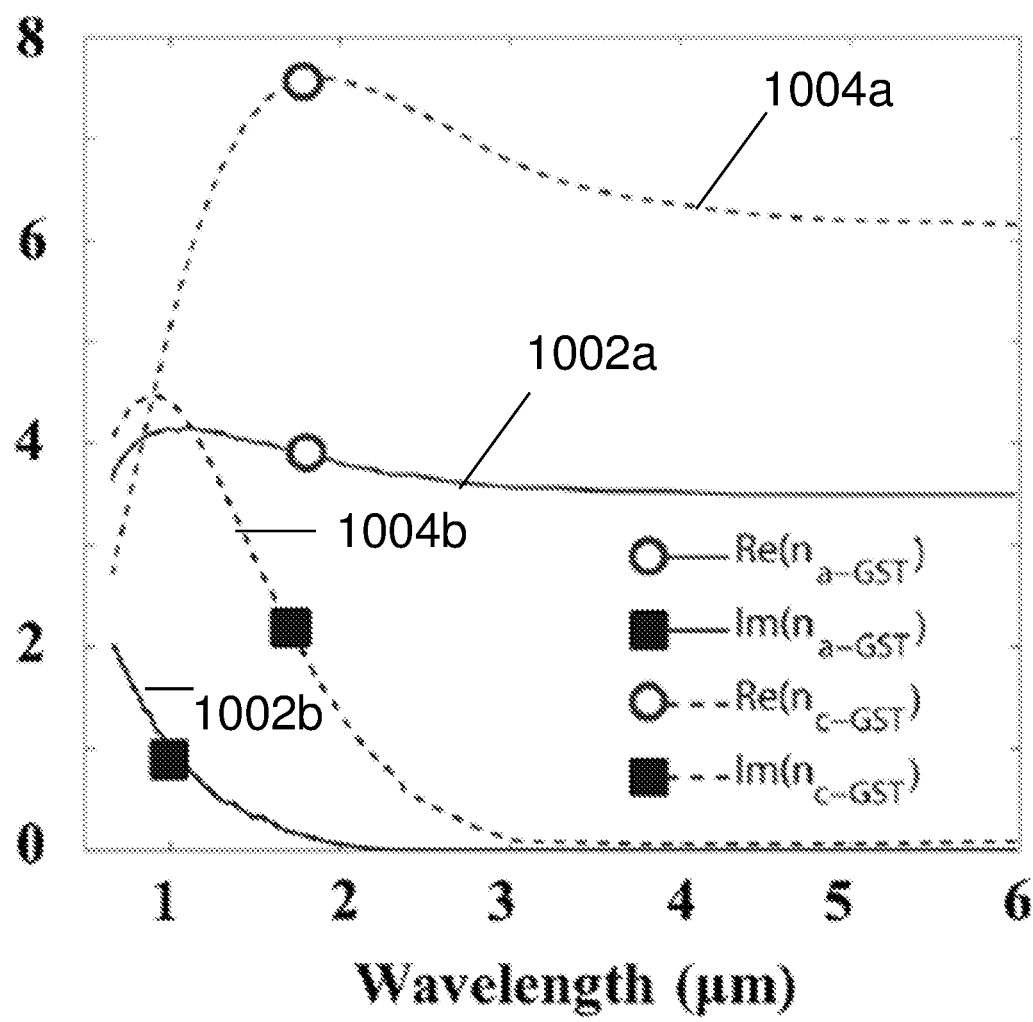
FIG. 10C is a plot of refractive index as a function of wavelength (in nanometers or nm) showing the real and imaginary parts of the refractive indices of the amorphous phase and the crystalline phase of $Ge_2Sb_2Te_5$ (GST) according to various embodiments.

FIG. 9 is a schematic showing a device 900 according to various embodiments. The device 900 may include a dielectric substrate 902 with a refractive index of about 1.45, an array 904 of nanodisks on the dielectric substrate 902, and a cover layer 904 covering the array 904 of nanodisks. The individual nanodisks are not labelled in FIG. 9 for the sake of clarity. FIG. 10A is a plot 1000a of refractive index (n) as a function of wavelength (in nanometers or nm) showing the different refractive indices of the amorphous phase and the crystalline phase of $Ge_2Sb_2Te_5$ (GST) according to various embodiments. FIG. 10B is a plot 1000b of coefficient ratio (k) as a function of wavelength showing the different extinction coefficients of the amorphous phase and the crystalline phase of $Ge_2Sb_2Te_5$ (GST) according to various embodiments. FIG. 10C is a plot 1000c of refractive index as a function of wavelength (in nanometers or nm) showing the real and imaginary parts of the refractive indices of the amorphous phase and the crystalline phase of $Ge_2Sb_2Te_5$ (GST) according to various embodiments. 1002a represents the real part of the refractive index when $Ge_2Sb_2Te_5$ (GST) is in the amorphous phase, and 1002b represents the imaginary part of the refractive index when $Ge_2Sb_2Te_5$ (GST) is in the amorphous phase. 1004a represents the real part of the refractive index when $Ge_2Sb_2Te_5$ (GST) is in the crystalline phase, and 1004b represents the imaginary part of the refractive index when $Ge_2Sb_2Te_5$ (GST) is in the crystalline phase.

Each nanodisk may be a cylinder having a diameter of 990 nm diameter and a height of 500 nm arranged in a square lattice with period 1.99 µm. Similar results may be obtained with different particle shapes such parallelepipeds, prisms, ellipsoids, etc. and also with different arrangements (hexagonal, honeycomb, triangular, etc.). The particular dimensions of the elements may be determined so that normally incident waves at wavelengths at around 3.1 µm may simultaneously excite electric and magnetic dipole resonances in the elements when GST comprised in the elements is in the amorphous phase. The induced electric and magnetic dipoles may have similar amplitude and phases. Under these conditions, the scattering from each particle in the array may be suppressed in the backward direction (acting as a Huygens's secondary source), leading to a suppression of reflection from the device 900 and, in the absence of absorption, a close-to-unity transmission.

Since these elements are (doubly) resonant with the incoming electromagnetic wave, these elements may induce phase retardation in the electromagnetic wave. In general, the value of the phase shift induced by a resonance depends on the precise spectral position of the resonance with respect to the wavelength of the incident wave. On the other hand, the spectral position at which the resonances are excited in the system may depend on the refractive index of the material of the elements and the geometry of the array. Thus, for a fixed geometry of the array, continuous variations in the material properties of the elements may translate in variations in the induced phase shift. By scaling or adjusting the different dimensions involved (height, radii of the elements and/or lattice period between elements), it may be possible to change the initial position of the resonances and, thus, the device characteristics at the working wavelength (phase shift at initial material phase state).

The device 900 may be configured to provide different phase shifts of the electromagnetic wave when the material phase state of the GST in the nanodisks is changed from entirely amorphous (initial material phase state) to material phase states having different degrees of crystallization. The device 900 may be designed in such a way that the phase shift may be carried out for the entire range of $2\pi$ radians by changing the material phase state of the GST comprised in the nanodisks. In order to achieve this, the device 900 may be designed to support two overlapping resonances.

The performance of the device based on GST nanodisks according to one embodiment for reconfigurable wave front manipulation has been demonstrated by means of full numerical simulations based on the Finite Differences Time Domain (FDTD, Lumerical Solutions). Values of the refractive index of GST in the amorphous and crystalline phases have been measured by ellipsometry. The refractive indexes for different degrees of crystallization are obtained based on an effective medium model (Chen et al., "*Hybrid phase-change plasmonic crystals for active tuning of lattice resonances*", Optical Express 21 13691, 2013).

As a first step, the initial material phase state may be fixed. The initial material phase may be the amorphous phase as the amorphous phase may exhibit almost no dissipation (Im(n)<0.001) and high real part of the refractive index Re(n)>3.5 at the desired wavelength. The geometry of the array may also be fixed.

The goal is to have an overlapping of resonances close to the desired operational wavelength, which is about 3.1 µm in the demonstration. To spectrally locate the resonances induced in the nanodisks, the reflection and transmission curves under normal incidence may be studied. The dips in transmission or peaks in reflection may correspond to the resonances, which may also be identified by fast change in the phase of the reflected or transmitted waves.

A full $2\pi$ radian range of phase shifts may be desirable to have complete control of the extent of the phase shift of the electromagnetic wave. As each resonance may "naturally" induce a maximum phase shift of $\pi$ radians, more than one resonance may be excited in order to induce a $2\pi$ radian phase shift.

In order to keep the transmission values high, the electric and magnetic dipole resonances may be overlapped. The aspect ratio of the particles may be tuned so that the electric and magnetic dipole resonances overlap. The interparticle gap, i.e. distance between neighbouring elements, may be fixed at 1 µm to avoid strong interparticle interaction and to avoid diffraction (i.e. the period of the array should be smaller than the wavelength in the external medium) at the desired operational wavelength. A square lattice may be used. In order to determine the appropriate aspect ratio to have overlapping of resonances, the radii of the nanodisks may be swept for fixed height (H) of 500 nm and the obtained transmission spectrum may be studied.

Figure 11A:
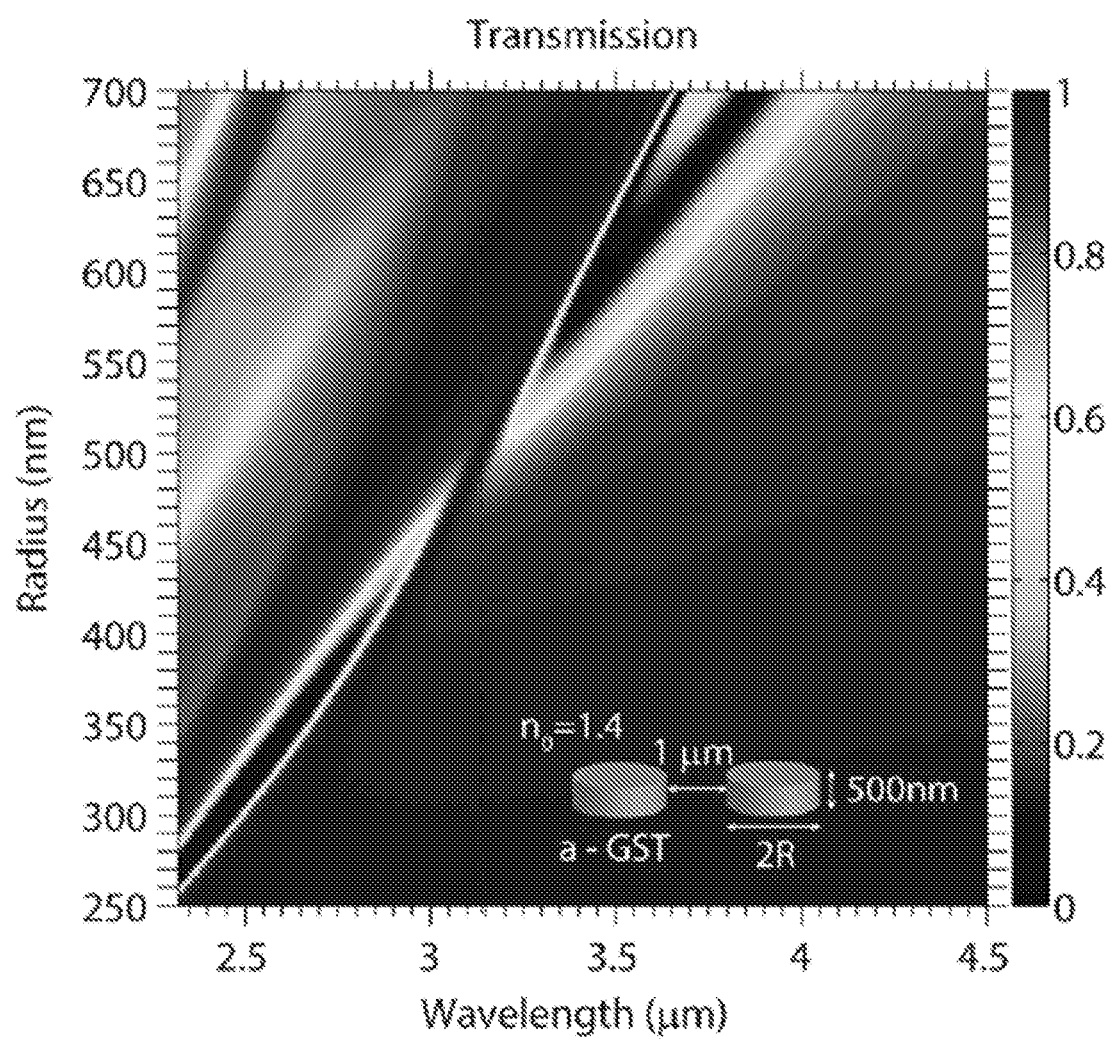
FIG. 11A shows a transmission map obtained according to various embodiments showing the transmission (from 0 to 1) plotted as a function of radius (nanometers or nm) and wavelength (micrometers or μm).
Figure 11B:
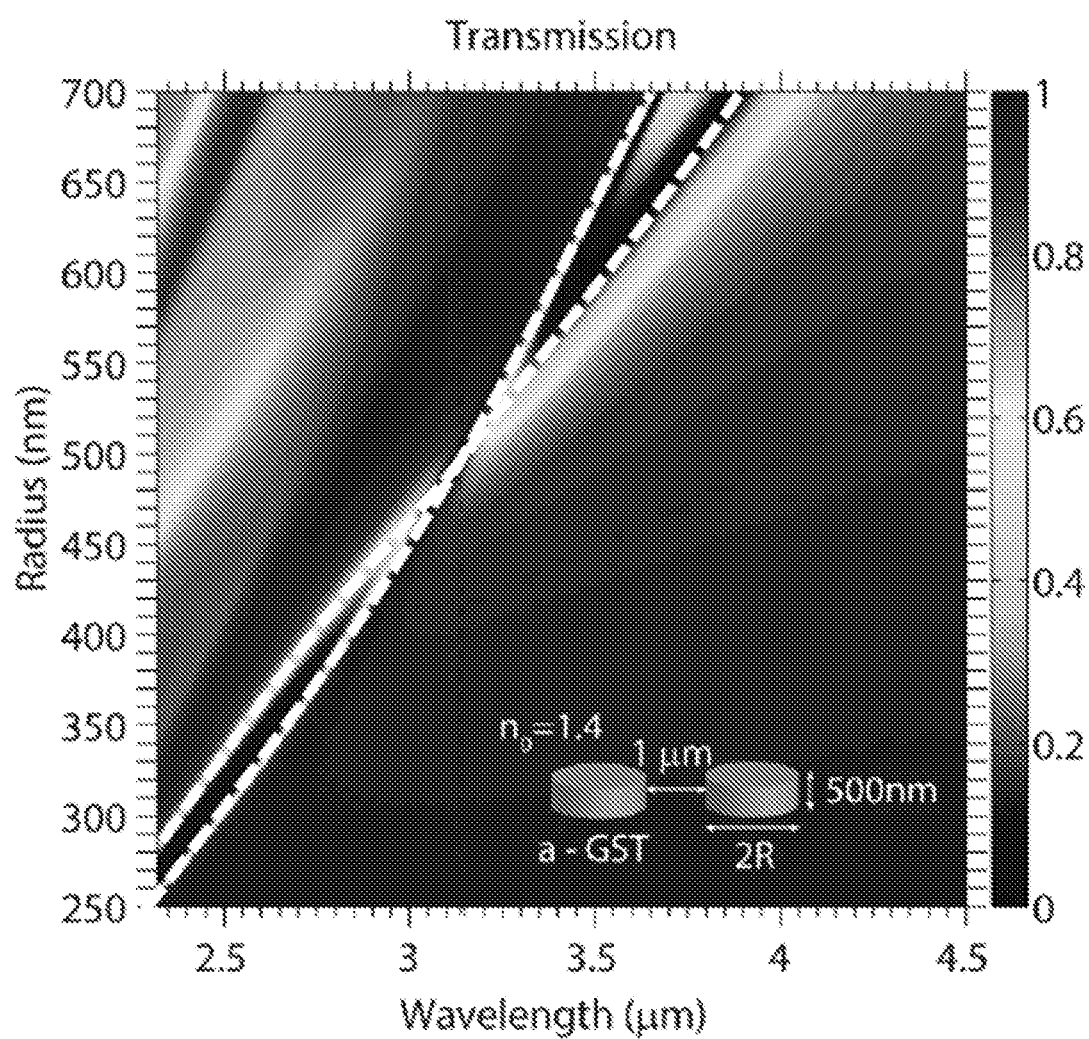
FIG. 11B shows a transmission map similar to the transmission map shown in FIG. 11A according to various embodiments but with the two resonances indicated by dashed lines.

FIG. 11A shows a transmission map 1100a obtained according to various embodiments showing the transmission (from 0 to 1) plotted as a function of radius (nanometers or nm) and wavelength (micrometers or µm). Transmission is a dimensionless quantity. The value of transmission may vary from 0, which represents zero transmission, i.e. 0% transmission, to 1, which represents perfect transmission, i.e. 100% transmission. The two resonances may be indicated by the two dips in which transmission vanishes. FIG. 11B shows a transmission map 1100b similar to the transmission map 1100a shown in FIG. 11A according to various embodiments but with the two resonances indicated by dashed lines.

Figure 11C:
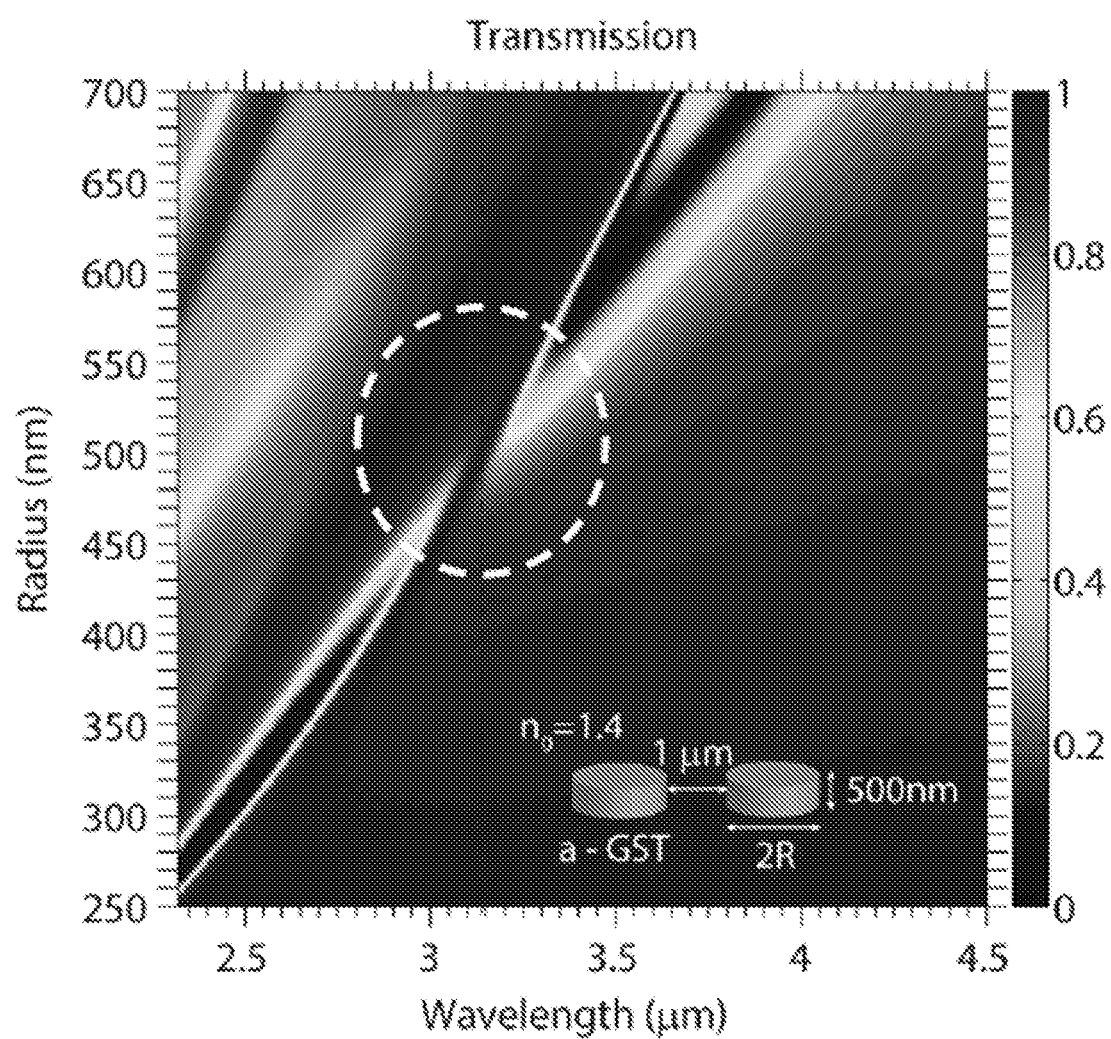
FIG. 11C is a transmission map similar to the transmission map shown in FIG. 11A according to various embodiments showing a crossing point of the magnetic and electric resonances.

FIG. 11C is a transmission map 1100c similar to the transmission map 1100a shown in FIG. 11A according to various embodiments showing a crossing point of the magnetic and electric resonances. The crossing point is indicated by a dashed circle in the map 1100c. At the crossing point, the magnetic dipole induced in the particles may have the sample amplitude and the same phase as the electric dipole induced in the particle, and thus the transmission becomes close to 1.

Figure 11D:
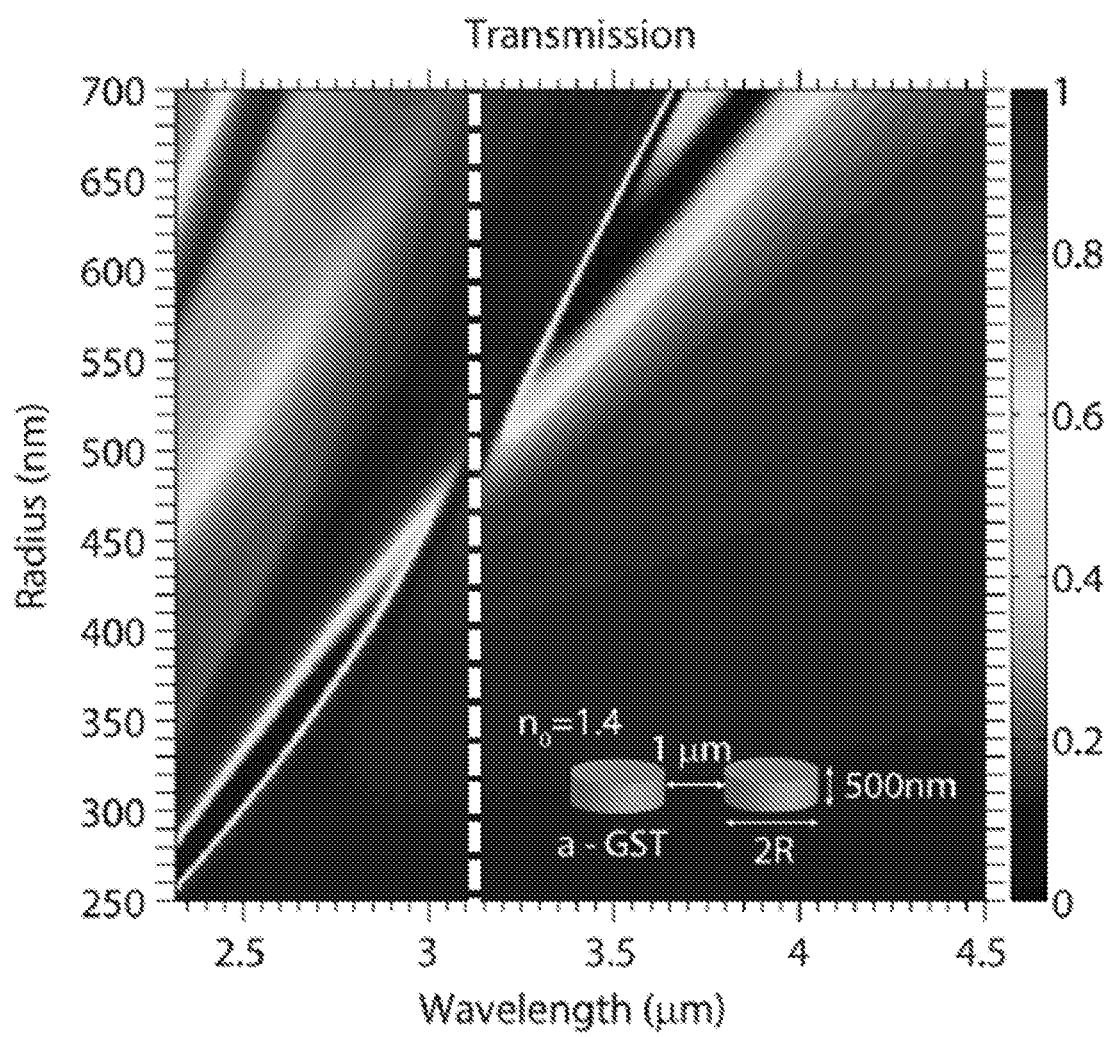
FIG. 11D is a transmission map similar to the transmission map shown in FIG. 11A according to various embodiments showing that the crossing point occurs at 3120 nm.
Figure 11E:
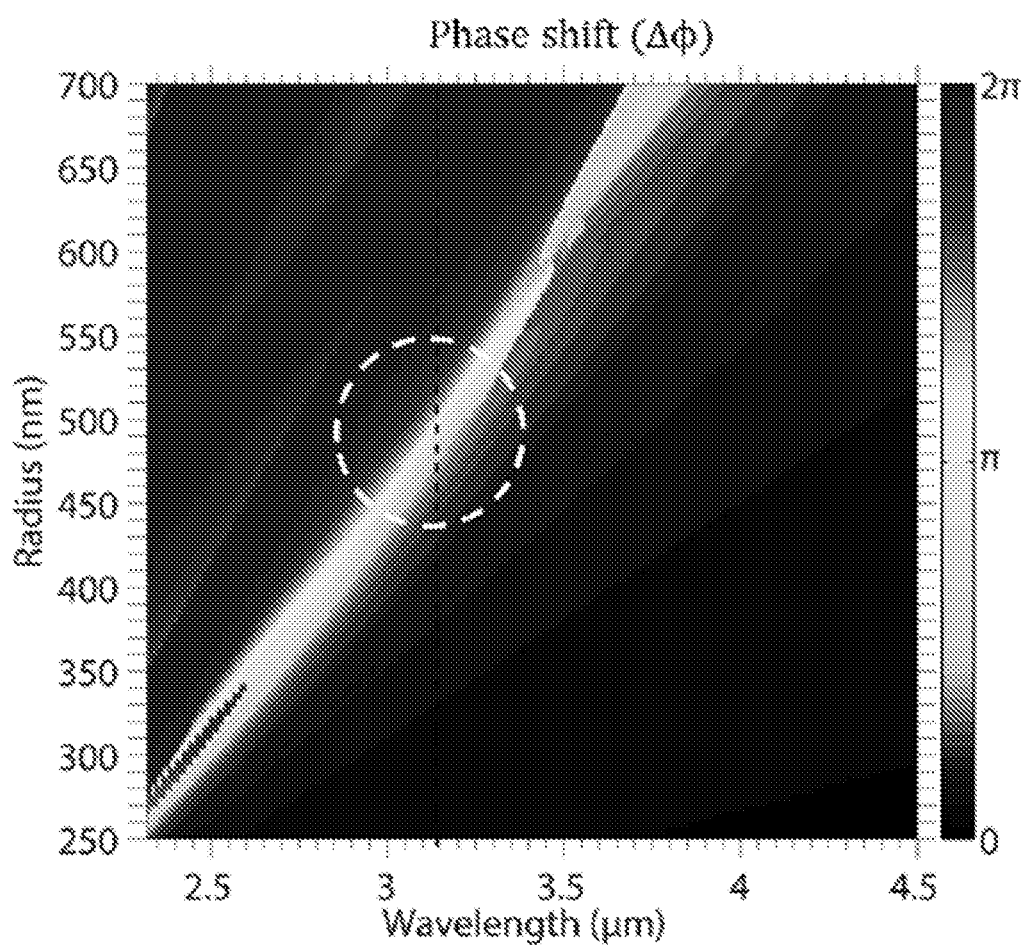
FIG. 11E is a phase map showing the phase shift (from 0 radian to π radians) plotted as a function of radius (nanometers or nm) and wavelength (micrometers or μm) according to various embodiments.
Figure 11F:
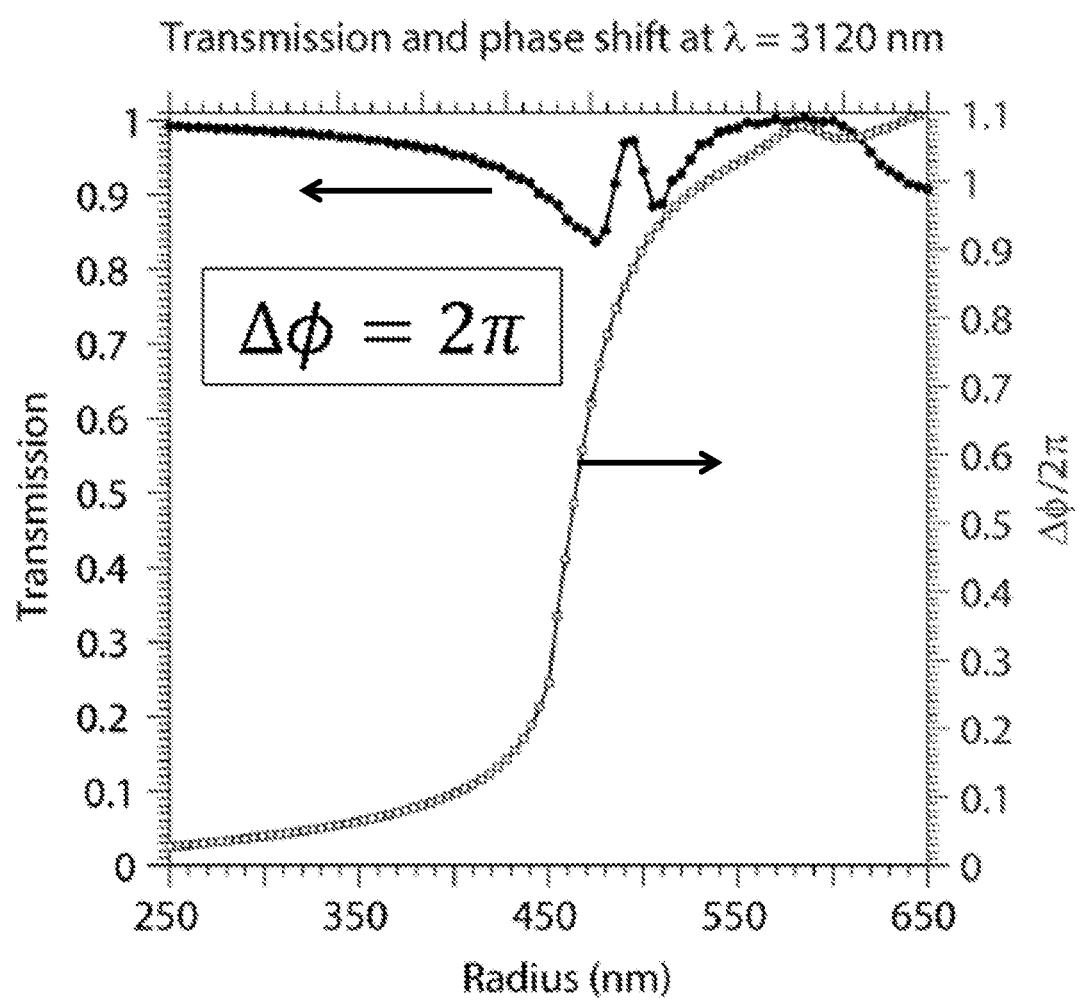
FIG. 11F is a plot showing the transmission amplitude and phase shift due to the device according to various embodiments at 3120 nm plotted as a function of the radius (nanometers or nm).

FIG. 11D is a transmission map 1100d similar to the transmission map 1100a shown in FIG. 11A according to various embodiments showing that the crossing point occurs at 3120 nm. FIG. 11E is a phase map 1100e showing the phase shift (from 0 radian to $2\pi$ radians) plotted as a function of radius (nanometers or nm) and wavelength (micrometers or µm) according to various embodiments. FIG. 11F is a plot 1100f showing the transmission amplitude and phase shift due to the device according to various embodiments at 3120 nm plotted as a function of the radius (nanometers or nm).

At the crosspoint, the particles may behave as ideal Huygens' sources and reflection may be inhibited, leading to almost perfect transmission. The two resonances are, still excited in the particles, as evidenced by the $2\pi$ phase variation observed in the phase shift map 1100e depicted in FIG. 11E (crosspoint is indicated by a dashed circle on the map 1100e). The wavelength may be fixed to the wavelength at which the resonances overlap, i.e. at $\lambda=3.12$ µm, so as to cover the $2\pi$ phase range and achieve full control of the wave front by changing the size of the particles, as shown in FIG. 11F. However, this may lead to a non-reconfigurable device.

A reconfigurable device may be achieved by making use of a changeable property. In the case of phase change materials, the phase change may provide the optical response of the device. The device may be designed in such a way that the material phase change allows exploring/adjusting of a range of 2π radians, without sacrificing a high level of transmission.

Transmission maps and phase maps may be carried out for other material phase states such as the crystalline states. The transmission and phase maps for different material phase states may be compared, and a point in the maps (i.e. at a selected wavelength and a selected radius) may be selected for which the full range of phases is covered and the transmission level is kept high. Once the point is selected, it may be possible to adjust the point to any other wavelength by re-scaling the geometry of the system while keeping the same aspect ratio of the particles.

If the refractive index of the material in the different phases is known, as in GST, the device may be designed taking into account that, as the refractive index of the particles is increased, the electric and magnetic dipole resonances may red-shift. In contrast, as the refractive index of the particles is decreased, the resonances may blue-shift. In various embodiments, the initial material state (amorphous) may have a lower refractive index than the final material state (crystalline). Thus, the resonances may red-shift during crystallization.

Figure 12:
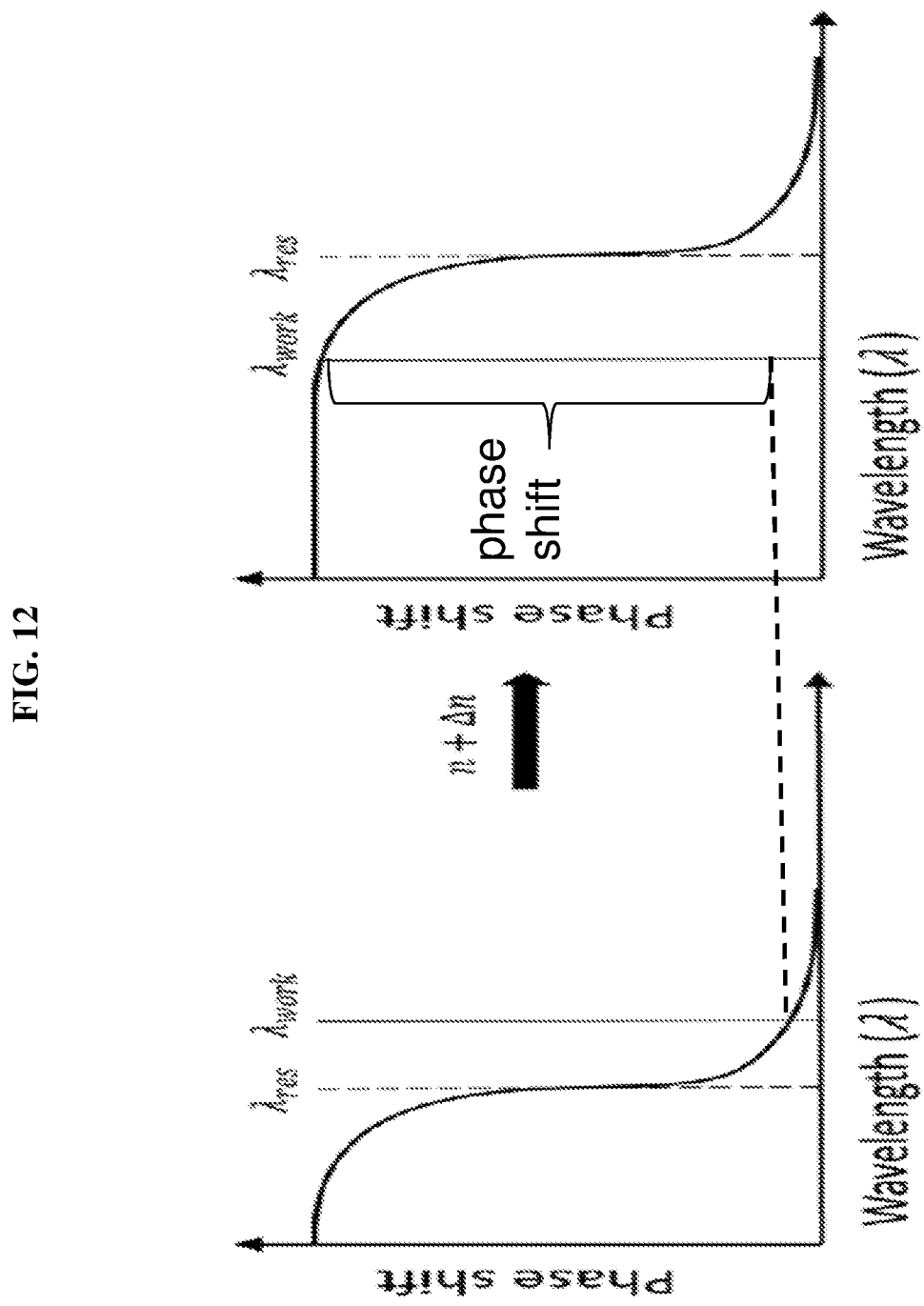
FIG. 12 shows plots of phase shift as a function of wavelength λ illustrating a design process of the device according to various embodiments.

FIG. 12 shows plots of phase shift as a function of wavelength λ illustrating a design process of the device according to various embodiments. The radius of the particle may be selected such that the resonances occur at a wavelength ($\lambda_{res}$) shorter than the desired working wavelength ($\lambda_{work}$) at the initial material phase state, but is close enough to the working wavelength so that when the refractive index is increased and the resonances are red-shifted, the resonant wavelength $\lambda_{res}$ "travels" through $\lambda_{work}$, inducing a phase shift of the electromagnetic wave at $\lambda_{work}$.

As an example, a particular wavelength of interest, namely λ=3.25 μm is chosen. At this wavelength, the corresponding chosen radius (R) of the element is 495 nm. For this radius, the resonances happen at wavelengths around λ=3.1 μm, i.e., at shorter wavelengths than the working wavelength.

Figure 13A:
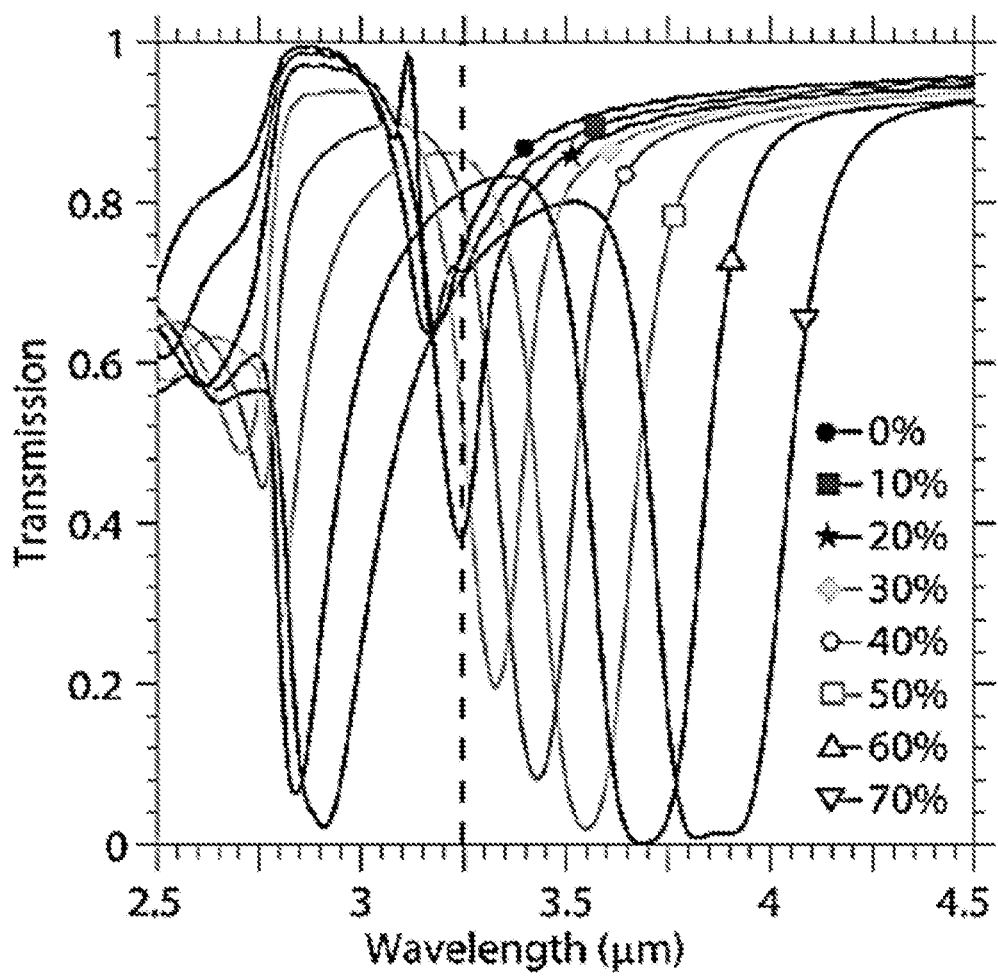
FIG. 13A is a plot of transmission as a function of wavelength (micrometer or μm) showing the transmission spectra of the array according to various embodiments when the elements are at different degrees of crystallization.
Figure 13B:
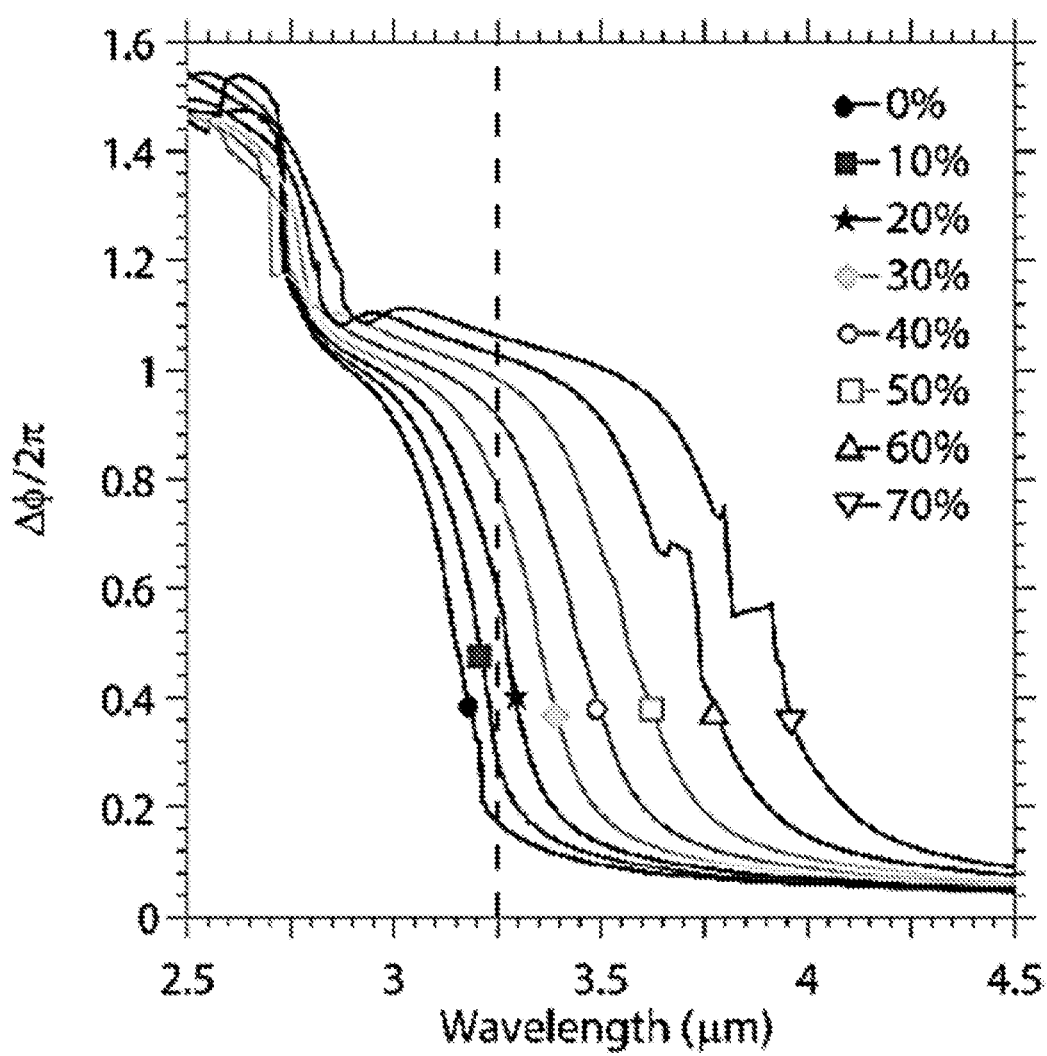
FIG. 13B is a plot of phase shift as a function of wavelength (micrometer or μm) showing the variation of phase shifts of the array according to various embodiments when the elements are at different degrees of crystallization.

FIG. 13A is a plot 1300a of transmission as a function of wavelength (micrometer or μm) showing the transmission spectra of the array according to various embodiments when the elements are at different degrees of crystallization. FIG. 13B is a plot 1300b of phase shift as a function of wavelength (micrometer or μm) showing the variation of phase shifts of the array according to various embodiments when the elements are at different degrees of crystallization. The different degrees of crystallization shown in FIGS. 13A and 13B are in steps of 10%. The red-shift of the resonances with increasing crystallization may be seen from FIG. 13B.

As the crystallization fraction increases, and as the associated refractive index increases, the electromagnetic wave may experience a phase shift. It may be possible to induce a phase shift extending over the entire 2π radians range by changing the material phase state of the elements while keeping an average transmission close to 60% within a predetermined frequency range.

Figure 13C:
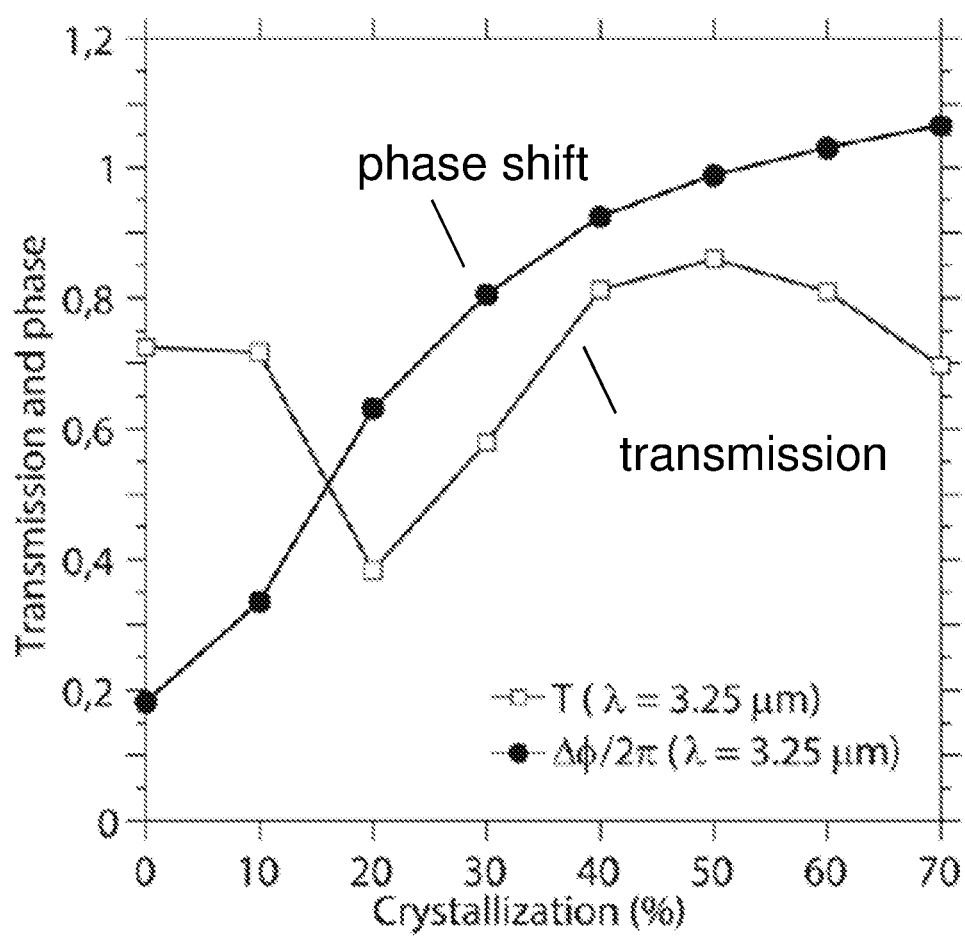
FIG. 13C is a plot of transmission/phase as a function of crystallization fraction (in percentage or %) of the array of elements according to various embodiments showing the variation of the transmission and phase shift of an electromagnetic wave transmitted through the array of elements when the elements are at different degrees of different crystallization.

FIG. 13C is a plot 1300c of transmission/phase as a function of crystallization fraction (in percentage or %) of the array of elements according to various embodiments showing the variation of the transmission and phase shift of an electromagnetic wave transmitted through the array of elements when the elements are at different degrees of different crystallization. The wavelength λ of the electromagnetic wave may be at 3.25 μm.

Figure 14:
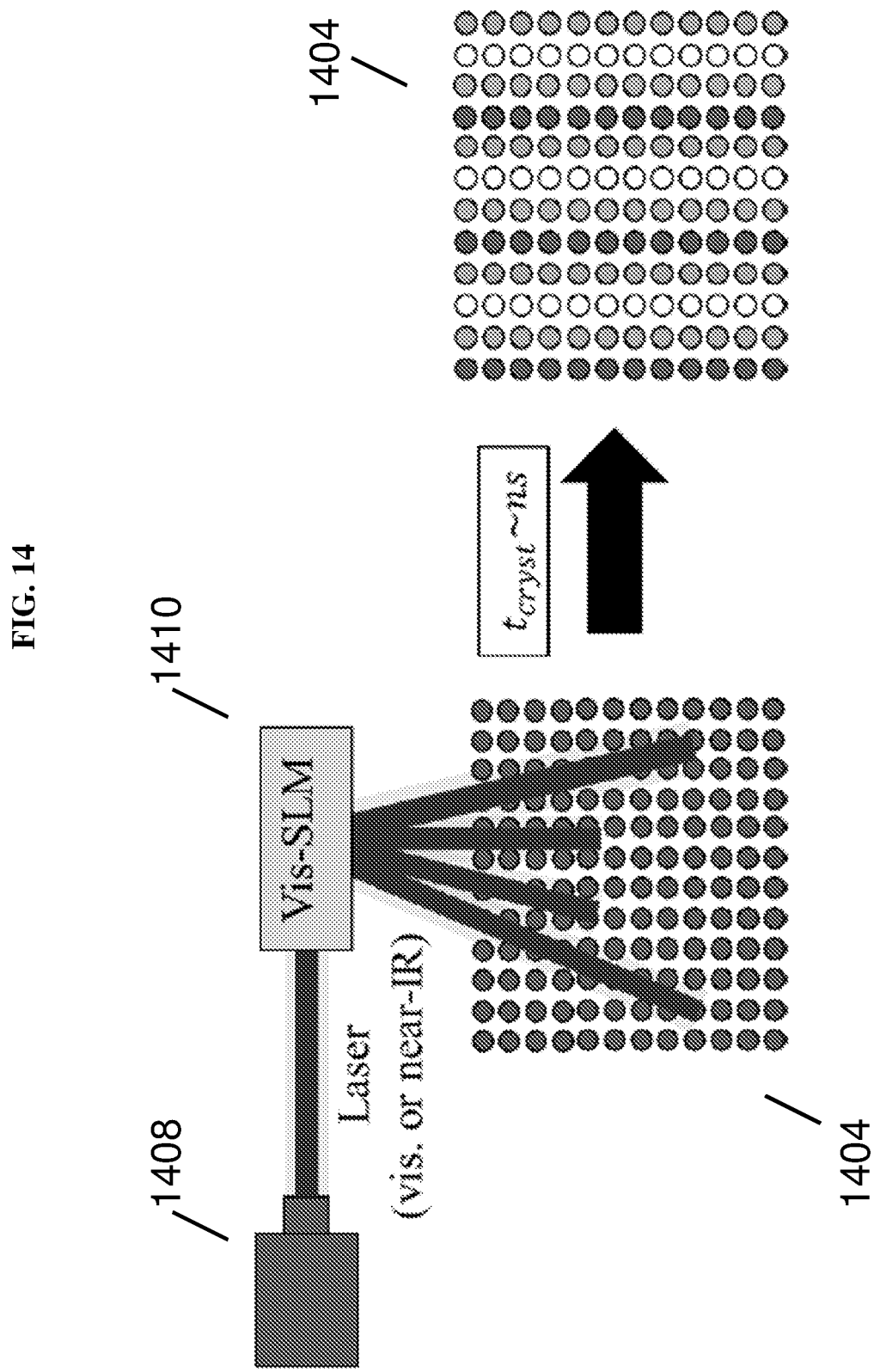
FIG. 14 is a schematic showing an arrangement for programming an array of elements according to various embodiments to subsequently control electromagnetic waves received by the array.

The degree of crystallization of GST may be controlled by, for instance, irradiating the material with a laser of given wavelength, duration and repetition rate. The process may be reversible, i.e., it can occur in both directions, and may be done multiple times without causing damage into the device or elements. The typical time scales involved in the crystallization process may be as short as nanoseconds, thus allowing fast reconfiguration of the device. Thus, reconfigurable wave front with GST may be achieved by changing the crystallization state of the individual particles. The crystallization states of individual particles may be changed by irradiating them with visible or near infrared light with the aid of a secondary spatial light modulator. FIG. 14 is a schematic showing an arrangement for programing an array 1404 of elements according to various embodiments to subsequently control electromagnetic waves received by the array 1404. A laser beam emitted from a laser source 1408 may be directed by a spatial light modulator 1410 to individual elements of array 1404 to cause a change in crystallization in the respective elements. The crystallization of different elements may be changed to different degrees. The crystallization/melting-by-irradiation time may be in the range of nanoseconds. The laser beam may be a visible light laser.

Consequently, the direction of propagation of a wave transmitting through the reconfigurable array 1404 may be controlled. The array 1404 may include cylindrical GST particles with height (H) of about 500 nm and radius (R) of about 495 nm arranged in a regular square lattice with minimum side-to side separation of about 1 μm.

Figure 15A:
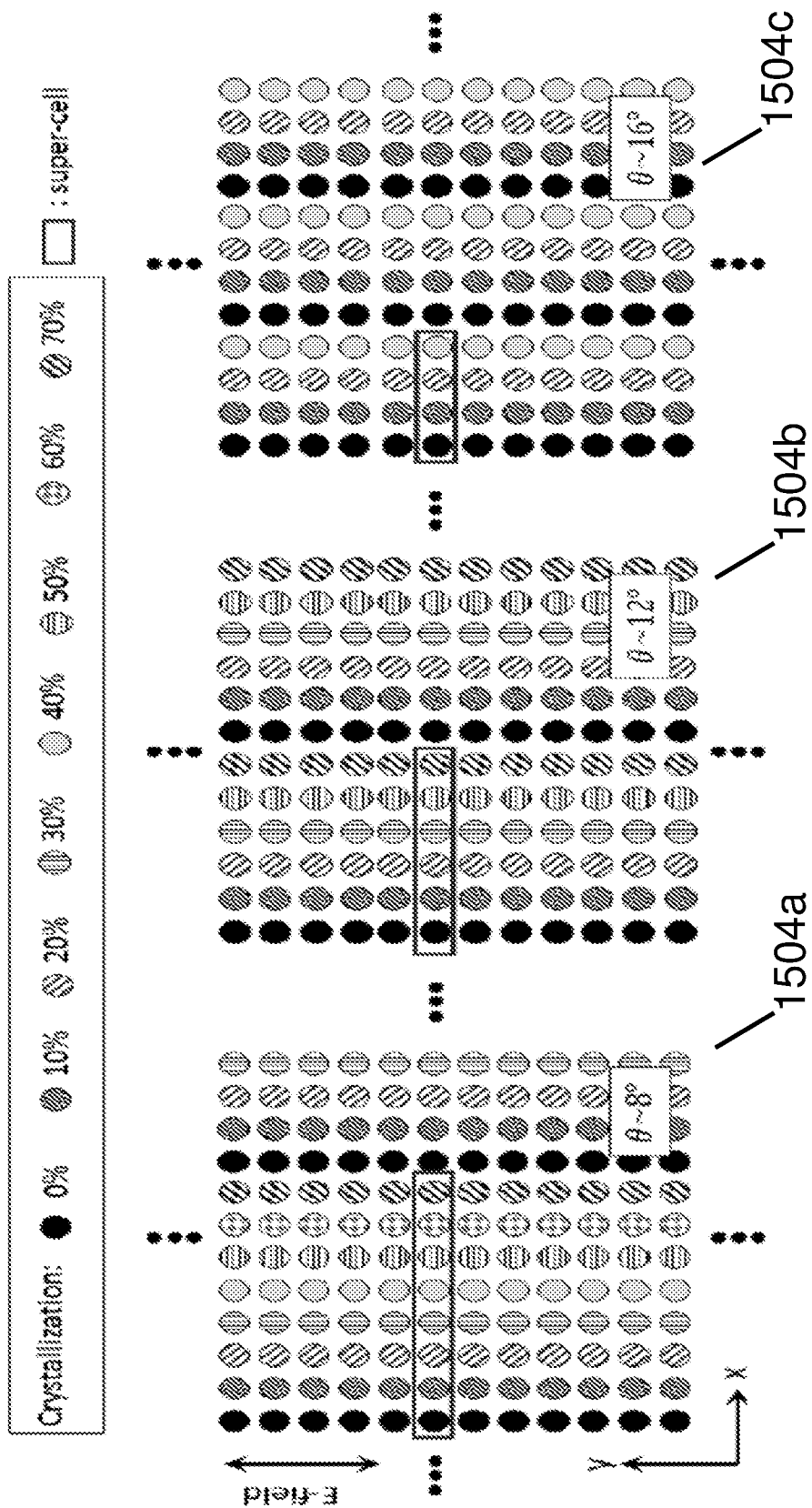
FIG. 15A is a schematic illustrating different arrays with individual elements or particles in different states of crystallization according to various embodiments.

FIG. 15A is a schematic illustrating different arrays 1504a-c with individual elements or particles in different states of crystallization according to various embodiments. The different particles in different state of crystallization are indicated with different patterned lines.

The basic unit cell of each array 1504a-c may be indicated by a box. The arrays 1504a-c may be formed from the basic unit cells repeated throughout each array 1504a-c. The unit cell may also be referred to as a super-cell. A full 2π phase shift may be mapped through the elements or particles with different crystallization states within each super-cell. Since the unit cells in the different arrays 1504a-c have a different number of elements or particles, and thus may be of a different total length, the bending angles may be different. The generalized Snell's law is provided as follows:

$$n * \sin\theta = \frac{\lambda}{2\pi} * \left(\frac{d\phi}{dx}\right) \tag{3}$$

where θ is the bending angle, φ represents the phase shift induced by an element or particle, x is the position, n is the refractive index of the external medium and λ is the wavelength. In addition, in the present case:

$$\frac{d\phi}{dx} = 2\pi/(N*P) \tag{4}$$

where N represents the number of elements or particles in the super-cell, and P is the lattice period. The array 1504a may induce a bending angle of about 8°, the array 1504b may induce a bending angle of about 12°, and the array 1504c may induce a bending angle of about 16°.

Figure 15B:
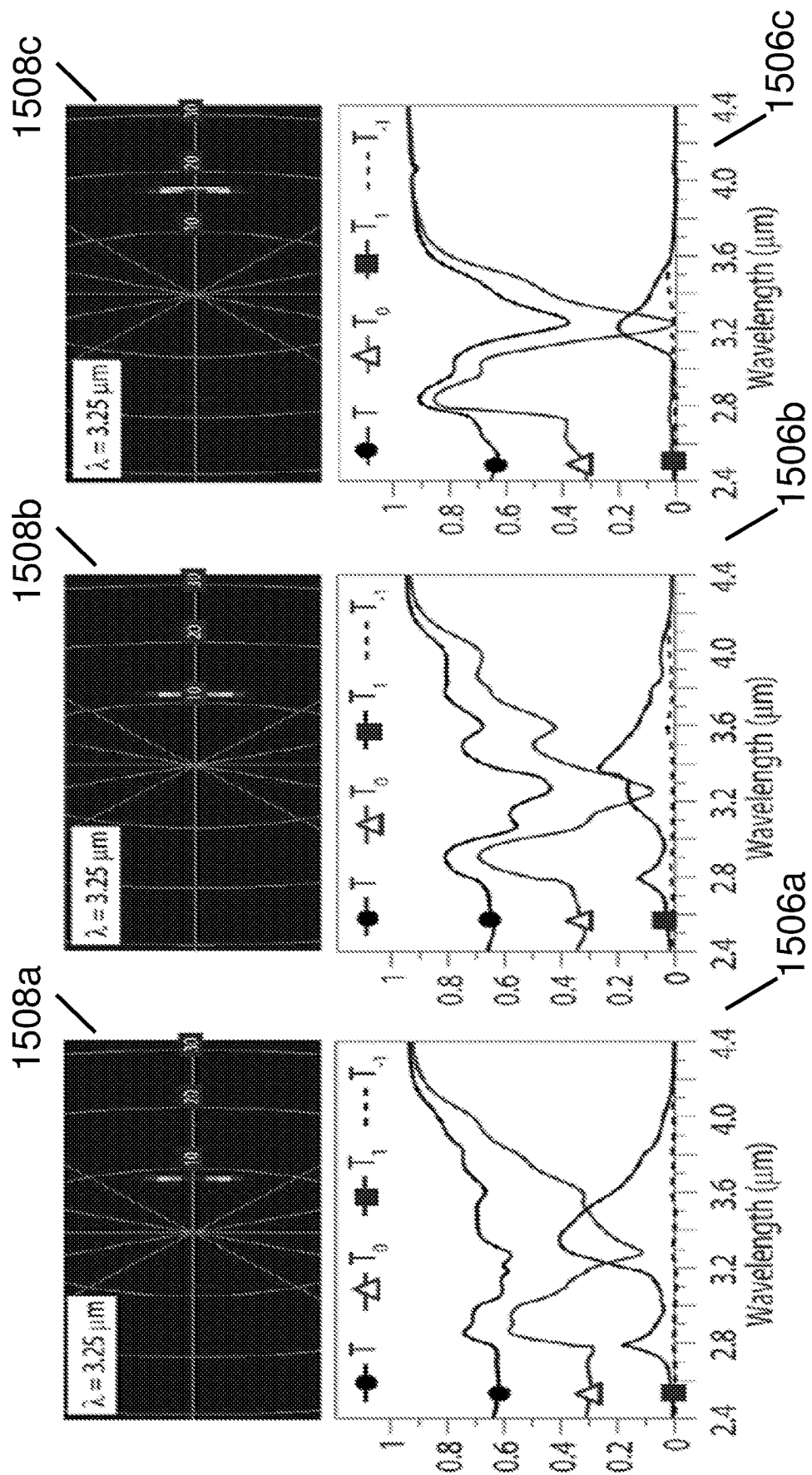
FIG. 15B show simulated transmission plots (transmission values and transmission values into the different diffraction orders plotted as a function of wavelength) and simulated far field radiation maps for plane waves normally incident on the arrays shown in FIG. 15A according to various embodiments.

FIG. 15B show simulated transmission plots 1506a-c (transmission values and transmission values into the different diffraction orders plotted as a function of wavelength) and simulated far field radiation maps 1508a-c for plane waves normally incident on the arrays shown in FIG. 15A according to various embodiments. The plot 1506a and map 1508a relate to the array 1504a, the plot 1506b and map 1508b relate to the array 1504b, while the plot 1506c and map 1508c relate to the array 1504c. The total transmission is indicated in 1506a-c by the curves with the solid circles. The curves with the hollow triangles indicate the transmission that pass directly through the arrays 1504a-c in the normal direction. In other words, these curves represent the transmission that pass in an unaffected manner through the arrays 1504a-c and are not bent. The curves indicated with a solid square represent the transmission that are bent at the desired angle, while the dashed curves represent transmission that are bent at an angle that is a mirror image to the desired angle. For instance, for the plot 1506a, the curve indicated with a solid square represents the transmission bent at an angle of 8°, while the dashed curve represents transmission bent at an angle of −8°. The difference between the total transmission (represented by the curve with the solid circle), and the sum of transmissions represented by the curve with the hollow triangle, the curve with the solid square, and the dashed curve, indicates the transmission bent at larger angles (i.e. at higher orders). The results show that for array 1504a, more than 40% of the total energy incident onto the array 1504a may be efficiently bent into the desired angle. For the cases of arrays 1504b, 1504c, the efficiency is about 20%. This shows that it may be possible to change the bending angle experienced by a wave transmitting through an array of elements or particles by varying or addressing the individual crystallization state of the individual elements or particles. The bending angles indicated in maps 1508a-c showing excellent agreement with those predicted.

FIGS. 15A and B show that square arrangement 1504a-c of GST nanoparticles may be used to efficiently bend an electromagnetic wave transmitting through a device according to various embodiments based on electric and magnetic resonances. Similar approaches may be taken to generate reconfigurable multi-step holograms, vortex beam generators, etc. With the recent advances in mid-IR radiation sources/detectors, this capability may turn out to be extremely useful as it may provide the necessary solution for modulation.

In summary, various embodiments may provide wave front modulation/manipulation at optical frequencies. Various embodiments may be based on arrays of sub-wavelength resonant particles made out of reconfigurable material which act as reconfigurable antennas. Each particle may be individually reconfigured through material phase modification and may provide sub-wavelength control of the wave front. One particular example may be based on $Ge_2Sb_2Te_5$ nanodisks. This example shows that full phase control with sub-wavelength resolution in the mid-IR range of frequencies may be possible.

Various embodiments may provide a low loss solution of modulating electromagnetic waves. Various embodiments may allow operation in transmission. The use of dielectric phase change material may reduce ohmic losses and may allow elements to be used as resonant perfect Huygens' sources.

Various embodiments may be used for phase modulation of mid-IR electromagnetic waves. Various embodiments may provide a feasible solution to phase modulation of such wavelengths in the atmospheric window, which may find use in the aerospace industry and military applications.

Various embodiments may involve devices which may be easily fabricated by familiar fabrication techniques. Various embodiments may involve devices which may be easily controlled using material phase. Various embodiments may involve GST, for which fabrication techniques and material phase are relatively familiar due to its extensive use in optical memories.

Various embodiments may have higher speed and lower loss, as compared to devices which use metals. For instance, GST may have a short crystallization time and have low dissipation.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device for controlling an electromagnetic wave, the device comprising:
   a medium; and
   an array of elements in contact with the medium and configured to receive the electromagnetic wave;
   wherein each element of the array of elements comprises a phase change material configured to switch from, at least, a first state to a second state in response to an external input, thereby changing an optical property of the respective element to control the electromagnetic wave.

2. The device according to claim 1,
   wherein the medium is a substrate or a superstrate.

3. The device according to claim 1,
   wherein the external input is an electrical signal, a thermal signal or an optical signal.

4. The device according to claim 1,
   wherein the phase change material is configured to switch from the second state to a third state in response to a further external input, thereby further changing the optical property of the respective element.

5. The device according to claim 1,
   wherein the first state is an amorphous phase and the second state is a phase that is at least partially crystallized.

6. The device according to claim 1,
   wherein the array of elements is a periodic array.

7. The device according to claim 1,
   wherein the electromagnetic wave is an infrared light.

8. The device according to claim 1,
   wherein a period between neighbouring elements of the array of elements is below 5 μm.

9. The device according to claim 1,
   wherein controlling the electromagnetic wave comprises adjusting the scattering of the electromagnetic wave.

10. The device according to claim 1,
    wherein the electromagnetic wave is controlled by changing at least one property of the electromagnetic wave selected from a group consisting of phase, amplitude, and polarization.

11. The device according to claim 1,
    wherein the optical property of the respective element is a refractive index of the respective element.

12. The device according to claim 1,
    wherein the phase change material is $Ge_2Sb_2Tb_5$.

13. The device according to claim 1, wherein each element is a nanostructure.

14. An arrangement comprising:
a device configured to control an electromagnetic wave, the device comprising:
a medium; and
an array of elements in contact with the medium and configured to receive the electromagnetic wave; and
an electromagnetic wave source configured to provide the electromagnetic wave to the array of elements;
wherein each element of the array of elements comprises a phase change material configured to switch from, at least, a first state to a second state in response to an external input, thereby changing an optical property of the respective element to control the electromagnetic wave.

15. The arrangement according to claim 14,
wherein the external input is a laser beam; and
wherein the arrangement further comprises:
a laser source configured to emit the laser beam; and
a spatial light modulator configured to direct the laser beam to the respective element to change the optical property of the respective element.

16. A method of forming a device for controlling an electromagnetic wave, the method comprising:
providing a medium; and
forming an array of elements in contact with the medium and configured to receive the electromagnetic wave;
wherein each element of the array of elements comprises a phase change material configured to switch from, at least, a first state to a second state in response to an external input, thereby changing an optical property of the respective element to control the electromagnetic wave.

17. A method of forming an arrangement, the method comprising:
providing a device configured to control an electromagnetic wave, the device comprising:
a medium; and
an array of elements in contact with the medium and configured to receive the electromagnetic wave;
wherein each element of the array of elements comprises a phase change material configured to switch from, at least, a first state to a second state in response to an external input, thereby changing an optical property of the respective element to control the electromagnetic wave; and
providing an electromagnetic wave source configured to provide the electromagnetic wave to the array of elements.

18. A method of operating a device to control an electromagnetic wave, the method comprising:
providing the electromagnetic wave to the device, the device comprising:
a medium; and
an array of elements in contact with the medium and configured to receive the electromagnetic wave, each element of the array of elements comprising a phase change material; and
applying the external input to switch the phase change material from, at least, a first state to a second state, thereby changing an optical property of the respective element to control the electromagnetic wave received by the array of elements.

19. The method according to claim 18,
wherein the electromagnetic wave is controlled by adjusting a phase of the electromagnetic wave from 0 radian to $2\pi$ radians.

20. A method of operating an arrangement to control an electromagnetic wave, the method comprising:
providing a device configured to control the electromagnetic wave, the device comprising:
a medium; and
an array of elements in contact with the medium and configured to receive the electromagnetic wave, each element of the array of elements comprising a phase change material;
providing an electromagnetic source to provide the electromagnetic wave to the device; and
applying the external input to switch the phase change material from the first state to the second state, thereby changing an optical property of the respective element to control the electromagnetic wave received by the array of elements.

* * * * *